US012680475B2

(12) United States Patent

Manzoni et al.

(10) Patent No.: US 12,680,475 B2

(45) Date of Patent: *Jul. 14, 2026

(54) TURBINE ENGINE HAVING A LUBRICATION SYSTEM

(71) Applicants: General Electric Company, Evendale, OH (US); GE Avio S.r.l., Rivalta di Turin (IT)

(72) Inventors: Miriam Manzoni, Rivalta di Turin (IT); Michele Gravina, Milan (IT); Federico Leonardi, Vinovo (IT); Alessandro Anderlini, Poggibonsi (IT); Ravindra Shankar Ganiger, Bengaluru (IN); Matthew D. Brothers, Cincinnati, OH (US)

(73) Assignees: GENERAL ELECTRIC COMPANY, Evendale, OH (US); GE AVIO S.R.L., Rivalta di Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 19/003,597

(22) Filed: Dec. 27, 2024

(65) Prior Publication Data

US 2026/0185465 A1 Jul. 2, 2026

(51) Int. Cl.
| | |
|---|---|
| *F01D 25/20* | (2006.01) |
| *F02C 7/06* | (2006.01) |
| *F02C 7/36* | (2006.01) |

(52) U.S. Cl.
CPC ............... *F01D 25/20* (2013.01); *F02C 7/06* (2013.01); *F02C 7/36* (2013.01); *F05D 2220/76* (2013.01);
(Continued)

(58) Field of Classification Search
CPC ..... F16H 57/0434–0435; F16H 57/045; F16H 57/0441–0443; F16H 57/0442–0443;
(Continued)

(56) References Cited

U.S. PATENT DOCUMENTS

| | | |
|---|---|---|
| 4,569,196 A | 2/1986 | Waddington et al. |
| 4,629,033 A | 12/1986 | Moore et al. |

(Continued)

FOREIGN PATENT DOCUMENTS

| | | |
|---|---|---|
| CN | 109404134 B | 6/2020 |
| FR | 3086003 B1 | 3/2020 |

(Continued)

OTHER PUBLICATIONS

Howe et al., "Advanced Gearbox Technology: Advanced Counter-Rotating Gearbox Detailed Design Report," NASA Contractor Report No. 180883, Pratt & Whitney Aircraft, United Technologies Corporation (1988).

*Primary Examiner* — Stephanie Sebasco Cheng

(74) *Attorney, Agent, or Firm* — Venable LLP; Peter T. Hrubiec; Michele V. Frank

(57) ABSTRACT

A turbine engine including a turbo-engine, a gearbox assembly, a propulsor, and a lubrication system. The lubrication system includes a lubricant tank that stores lubricant therein, one or more primary gearbox lubricant supply lines in fluid communication with the lubricant tank and the gearbox assembly, one or more secondary gearbox lubricant supply lines in fluid communication with the lubricant tank and the gearbox assembly, and a lubricant pump for supplying the lubricant to the gearbox assembly from the lubricant tank through the one or more primary gearbox lubricant supply lines and the one or more secondary gearbox lubricant supply lines. The lubrication system modulates a mass flow rate of the lubricant to the gearbox assembly through at least one of the one or more primary gearbox lubricant supply lines or the one or more secondary gearbox lubricant supply lines.

20 Claims, 6 Drawing Sheets

(52) U.S. Cl.
    CPC ................ *F05D 2260/4031* (2013.01); *F05D 2260/40311* (2013.01); *F05D 2260/98* (2013.01)

(58) Field of Classification Search
    CPC ... F16H 57/0445; H02K 9/19–20; F02C 7/06; F02C 7/36; F02C 3/107; F02C 3/113; F01D 15/12; F01D 25/20; F01D 25/125; F01D 25/16; F01D 15/10; F01D 25/18–22; F05D 2260/40311; F05D 2260/98; F05D 2240/50; F05D 2220/76–77
    See application file for complete search history.

(56) References Cited

U.S. PATENT DOCUMENTS

| | | | |
|---|---|---|---|
| 4,856,273 A | | 8/1989 | Murray |
| 5,067,454 A | | 11/1991 | Waddington et al. |
| 6,058,694 A | | 5/2000 | Ackerman et al. |
| 6,363,707 B2 | | 4/2002 | Junquera |
| 8,672,095 B2 | | 3/2014 | Charier et al. |
| 8,833,086 B2 | * | 9/2014 | Parnin ................ F16H 57/0486 60/39.08 |
| 8,844,257 B2 | | 9/2014 | Parnin et al. |
| 9,810,113 B2 | | 11/2017 | Krug |
| 9,909,453 B2 | | 3/2018 | Fang et al. |
| 10,145,276 B2 | * | 12/2018 | Parnin .................... F01M 11/10 |
| 10,436,067 B2 | | 10/2019 | Dolman et al. |
| 10,513,949 B2 | * | 12/2019 | Parnin ................. F16H 57/0442 |
| 10,823,005 B2 | | 11/2020 | Fang et al. |
| 11,280,221 B2 | | 3/2022 | Dolman et al. |
| 11,549,399 B2 | | 1/2023 | Dolman et al. |
| 11,719,113 B2 | * | 8/2023 | Muldoon .............. F01D 25/162 60/782 |
| 11,959,589 B2 | * | 4/2024 | Patel ........................ H02K 9/19 |
| 2016/0032773 A1 | * | 2/2016 | James .................... F01D 25/16 416/170 R |
| 2023/0101143 A1 | * | 3/2023 | Williams ............ F16H 57/0435 184/6.11 |
| 2024/0093618 A1 | | 3/2024 | Picard |

FOREIGN PATENT DOCUMENTS

| | | | |
|---|---|---|---|
| FR | 3127024 | A1 | 3/2023 |
| FR | 3127025 | A1 | 3/2023 |
| FR | 3129436 | A1 | 5/2023 |
| FR | 3129690 | A1 | 6/2023 |
| FR | 3130747 | A1 | 6/2023 |
| FR | 3130874 | A1 | 6/2023 |
| FR | 3130875 | A1 | 6/2023 |
| FR | 3130877 | A1 | 6/2023 |
| FR | 3130895 | A1 | 6/2023 |

* cited by examiner

TURBINE ENGINE HAVING A LUBRICATION SYSTEM

TECHNICAL FIELD

The present disclosure relates generally to turbine engines with lubrication systems, for example, for gearbox assemblies in turbine engines.

BACKGROUND

Turbines engine generally include a propulsor (e.g., a fan or a propeller) and a turbo-engine arranged in flow communication with one another. A gearbox assembly transfers torque and power from one rotating component to another rotating component (e.g., from the turbo-engine to the propulsor). A lubrication system provides lubricant to one or more rotating components of the turbine engine, including the gearbox assembly.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
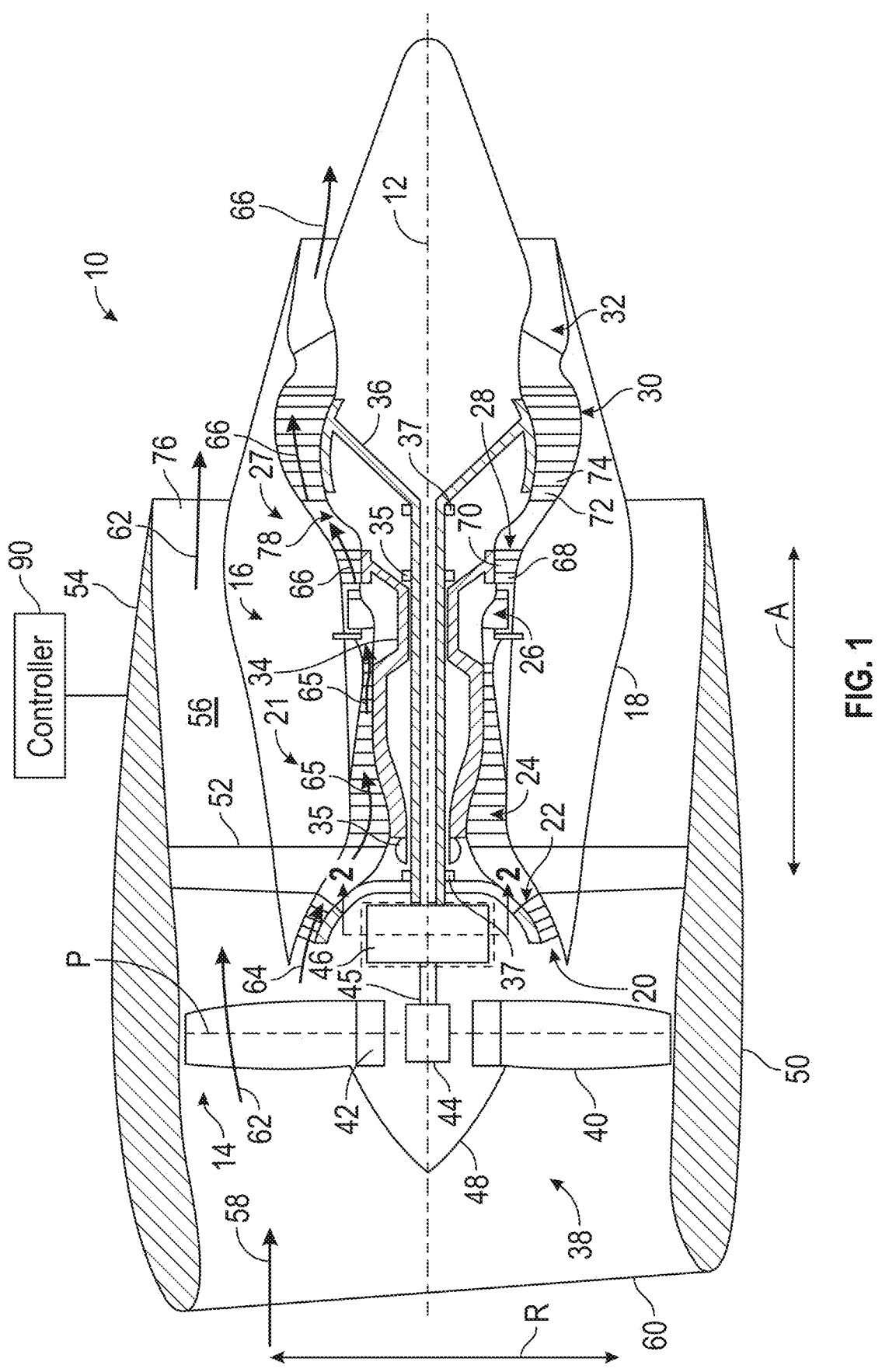
FIG. 1 is a schematic, cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below.

While specific embodiments are discussed, this is done for illustration purposes only. A person skilled in the relevant art will recognize that other components and configurations may be used without departing from the present disclosure.

As used herein, the terms "first," "second," "third," etc., may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. More particularly, forward and aft are used herein with reference to a direction of travel of the vehicle and a direction of propulsive thrust of the gas turbine engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "propulsor" is a component of the turbine engine that is drivingly coupled to the turbo-engine such that rotation of the components of the turbo-engine causes the propulsor to rotate and to generate thrust. A propulsor can include a fan or a propeller. In turbofan engines (e.g., ducted fan engines or unducted fan engines), the propulsor is a fan. In turboprop engines, the propulsor is a propeller.

As used herein, the terms "mesh," "meshing," or "intermesh" refer to a location between two gears at which gear teeth of the two gears become intertwined, or otherwise become mated.

As used herein, "friction" of two rotating components occurs at the interface of contact between the two rotating components and is the result of the contact of the two rotating components sliding and rolling with respect to each other. The friction is a function of the geometrical configuration and operative conditions (e.g., transmitted power through the two rotating components).

As used herein, "windage" of a rotating component occurs due to the interaction of the rotating component with the fluids (e.g., air or lubricant) surrounding the rotating component. The windage is caused by drag of the rotating component within the fluids and is a function of the geometrical configuration and operative conditions. One of the main drivers of the windage is the amount of lubricant interacting with the rotating component.

As used herein, a "gearbox efficiency" is a ratio of output power from the gearbox assembly to input power into the gearbox assembly. In particular, the gearbox efficiency is the ratio of the output power through the output shaft to the input power from the input shaft. In some embodiments, the input shaft is a shaft of the turbo-engine (e.g., a low-pressure shaft) and the output shaft is a propulsor shaft of the propulsor.

As used herein, the terms "low," "mid" (or "mid-level"), and "high," or their respective comparative degrees (e.g., "lower" and "higher", where applicable), when used with compressor, combustor, turbine, shaft, propulsor, or turbofan engine components, each refers to relative pressures, relative speeds, relative temperatures, or relative power outputs within a turbine engine unless otherwise specified. For example, a "low-power" setting defines the turbine engine, or the combustor, configured to operate at a power output lower than a "high-power" setting of the turbine engine or the combustor, and a "mid-level power" setting defines the turbine engine, or the combustor, configured to operate at a power output higher than a "low-power" setting and lower than a "high-power" setting. The terms "low," "mid" (or "mid-level") or "high" may additionally, or alternatively, be relative to minimum allowable speeds, pressures, or temperatures. The terms "low," "mid" (or "mid-level") or "high" may be understood to be relative to minimum or maximum allowable speeds, pressures, or temperatures relative to normal, desired, steady state, etc., operation of the turbine engine. A mission cycle for a turbine engine includes, for example, a low-power operation, a mid-power operation, and a high-power operation. Low-power operation includes, for example, engine start, idle, taxiing, and approach. Mid-power operation includes, for example, cruise. High-power operation includes, for example, takeoff and climb.

The various power levels of the turbofan engine are defined as a percentage of a sea level static (SLS) maximum engine rated thrust. Low-power operation includes, for example, less than thirty percent (30%) of the SLS maximum engine rated thrust of the turbine engine. Mid-power operation includes, for example, thirty percent (30%) to eighty-five percent (85%) of the SLS maximum engine rated thrust of the turbine engine. High-power operation includes, for example, greater than eighty-five percent (85%) of the SLS maximum engine rated thrust of the turbine engine. The values of the thrust for each of the low-power operation, the mid-power operation, and the high-power operation of the turbine engine are exemplary only, and other values of the thrust can be used to define the low-power operation, the mid-power operation, and the high-power operation.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A gear assembly for a turbine engine or other applications is used to transmit power and motion from one rotating component to another rotating component. For example, a turbine engine can include a gearbox assembly that transmits power from a shaft of a turbo-engine to a propulsor of the turbine engine. Rotating parts (e.g., the gears), however, are not one hundred percent (100%) efficient. During operation of the gear assembly, the gears and the bearings generate power losses due to friction (F) (e.g., between the gear teeth of the gears) and interaction of the rotating components with the fluids (e.g., lubricant) inside the gear assembly. The interaction of the rotating components with the fluids is referred to as windage (W) and is caused by drag of the rotating component within the fluids. The friction and the windage produce heat within the gear assembly that needs to be dissipated. Lubricant, such as, by way of a non-limiting example, oil, can be used to lubricate and to cool the gear assembly components (e.g., the gears and the bearings) through dedicated lubricant streams directed to the bearings and the meshing points of the gears.

The amount of lubricant needed in the lubrication system for lubricating the gears or the bearings is determined based on a maximum delta temperature (dT) that each component can sustain before becoming damaged (e.g., gear scuffing). For example, the maximum delta temperature (dT) is based on the material properties of the components, as well as the amount of power losses from friction and windage (e.g., fluidic losses) that heat up (e.g., increase the temperature of) the components. Using more lubricant in the lubrication system results in a lower dT and lower damage to the gears and to the bearings. However, the greater the amount of lubricant flow through the lubrication system results in greater fluidic losses such that the efficiency of the gearbox is reduced. In particular, the friction and the windage from the lubricant on the gears causes the output torque to reduce for a same power output level as compared to if there is less lubricant in the lubrication system. Using less lubricant in the lubrication system results in greater efficiency due to lesser fluidic losses, but a higher dT and a higher risk of damage to the gears and to the bearings.

Further, the amount of lubricant through the lubrication system varies during a typical power cycle of the turbine engine. In turbine engines for aircraft, in particular, the lubricant flow is less during low-power conditions (e.g., idle, taxiing, etc.) and greater during mid-power conditions (e.g., cruise), and even greater during high-power conditions (e.g., takeoff or climb). Typically, the amount of lubricant in the lubrication system is determined based on lubricant requirements during high-power operation. Because of this, the amount of lubricant provided to the gearbox is not optimized (e.g., reducing the dT, while maintaining efficiency of the gearbox) for the low-power conditions and the mid-power conditions. Accordingly, there is more lubricant than needed to reduce the dT, to reduce the damage to the gears and the bearings, and, thus, the gearbox efficiency is reduced during the low-power conditions and the mid-power conditions.

Moreover, in a standard gearbox lubrication system, each component that needs lubrication has a single delivery line connected to the pump. The dimensions of the pipes and the nozzles belonging to the single delivery line are sized considering the lubricant flow required at a design point (DP), typically, take-off conditions (e.g., high-power conditions), in order to match a certain number of thermal constraints and fluidic constraints (e.g., the dT and efficiency discussed above). The lubricant flow in all the other operating conditions is driven by the value set at the design point and the pump output is typically linear with the speed of the low-pressure shaft of the turbine engine. Thus, the lubricant flow cannot be optimized for less demanding conditions, such as, for example, cruise (e.g., the mid-power conditions or the low-power conditions). This results in a negative impact on the engine efficiency and the fuel consumption of the turbine engine. In this way, the lubricant flow is more than required during the mid-power conditions and the low-power conditions, causing unjustified increment of the windage and the fluid-dynamic losses that represent an important part of the total heat rejection of the gearbox assembly, as compared to gearbox assemblies with the same gear dimensions and shaft speeds, but without the benefit of the present disclosure.

Accordingly, the present disclosure provides for two sets of lubricant supply lines (e.g., primary supply lines and secondary supply lines) to each component that requires lubrication (e.g., the gearbox assembly, turbine engine bearings, etc.). In particular, the present disclosure includes primary lubricant injectors fluidly coupled with the primary supply lines and secondary lubricant injectors fluidly coupled with the secondary supply lines. The area of the orifices of the injectors is set to achieve a particular jet speed of the lubricant injected from the injectors. The optimal jet speed depends on a ratio between the gearbox speed and the jet speed. In systems without the benefit of the present disclosure, the ratio is selected based on high-power (e.g., take-off) conditions, and, thus, is optimized for mid-power and low-power as the lubricant flow and gearbox speed scale linearly with engine speed (e.g., speed of the turbo-engine).

In demanding conditions (e.g., take-off), both sets of supply lines are open, allowing all the pump delivered lubricant flow to enter the gearbox assembly. In less demanding conditions (e.g., cruise), a shut-off valve (e.g., controlled by a controller) closes the secondary supply lines, reducing the amount of lubricant in the gearbox assembly with a consequent increment of the gearbox efficiency because windage losses are contained. Additionally, a proportional valve on the primary supply lines can be located in parallel to the shut-off valve. The proportional valve allows further lubricant flow optimization during the low-power conditions or the mid-power conditions.

Thus, the present disclosure provides for a lubrication system providing an amount of the lubricant and a temperature of the lubricant for reducing damage to the gear assembly, while minimizing gearbox losses (e.g., due to friction and windage of the gears) and maximizing the gearbox efficiency for all operating conditions of the gearbox assembly over the entire operating cycle of the turbine engine by modulating the lubricant flow to the gearbox assembly. Further, having two lubricant supply lines allows for the lubricant flow to scale linearly with the engine speed by reducing the number of orifices (e.g., the total orifice area) when one line is turned off, while also allowing the lubricant to be modulated.

Referring now to the drawings, FIG. 1 is a schematic, cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a propulsor section 14 and a turbo-engine 16 disposed downstream from the propulsor section 14.

The turbo-engine 16 includes, in serial flow relationship, a compressor section 21, a combustion section 26, and a turbine section 27. The turbo-engine 16 is substantially enclosed within an outer casing 18 that is substantially tubular and defines a core inlet 20 that is annular about the longitudinal centerline axis 12. As schematically shown in FIG. 1, the compressor section 21 includes a booster or a low-pressure (LP) compressor 22 followed downstream by a high-pressure (HP) compressor 24. The combustion section 26 is downstream of the compressor section 21. The turbine section 27 is downstream of the combustion section 26 and includes a high-pressure (HP) turbine 28 followed downstream by a low-pressure (LP) turbine 30. The turbo-engine 16 further includes a jet exhaust nozzle section 32 that is downstream of the turbine section 27, a high-pressure (HP) shaft 34, and a low-pressure (LP) shaft 36. The HP shaft 34 drivingly connects the HP turbine 28 to the HP compressor 24. The HP turbine 28 and the HP compressor 24 rotate in unison through the HP shaft 34. The LP shaft 36 drivingly connects the LP turbine 30 to the LP compressor 22. The LP turbine 30 and the LP compressor 22 rotate in unison through the LP shaft 36. The compressor section 21, the combustion section 26, the turbine section 27, and the jet exhaust nozzle section 32 together define a core air flow path.

The turbine engine 10 also includes one or more shaft bearings, including one or more HP shaft bearings 35 and one or more LP shaft bearings 37. The HP shaft bearings 35 support rotation of the HP shaft 34. The LP shaft bearings 37 support rotation of the LP shaft 36. The HP shaft bearings 35 and the LP shaft bearings 37 can include any type of bearings for supporting rotation of the shafts, such as, for example, ball bearings, roller bearings, or the like.

For the embodiment depicted in FIG. 1, the propulsor section 14 includes a propulsor 38 (e.g., a variable pitch propulsor) having a plurality of propulsor blades 40 coupled to a disk 42 in a spaced apart manner. In the embodiment of FIG. 1, the propulsor 38 is a fan that is driven by the turbo-engine 16. In some embodiments, the propulsor 38 is a propeller that is driven by the turbo-engine 16. The propulsor blades 40 extend outwardly from the disk 42 generally along the radial direction R. In the case of a variable pitch propulsor, the plurality of propulsor blades 40 is rotatable relative to the disk 42 about a pitch axis P by virtue of the propulsor blades 40 being operatively coupled to an actuation member 44 configured to collectively vary the pitch of the propulsor blades 40 in unison. The propulsor blades 40, the disk 42, and the actuation member 44 are together rotatable about the longitudinal centerline axis 12 via a propulsor shaft 45 that is powered by the LP shaft 36 across a power gearbox, also referred to as a gearbox assembly 46. In this way, the propulsor 38 is drivingly coupled to, and powered by, the turbo-engine 16, and the turbine engine 10 is an indirect drive engine. The gearbox assembly 46 is shown schematically in FIG. 1. The gearbox assembly 46 is a reduction gearbox assembly for adjusting the rotational speed of the propulsor shaft 45 and, thus, the propulsor 38 relative to the LP shaft 36 when power is transferred from the LP shaft 36 to the propulsor shaft 45.

Referring still to the exemplary embodiment of FIG. 1, the disk 42 is covered by a propulsor hub 48 that is aerodynamically contoured to promote an airflow through the plurality of propulsor blades 40. In addition, the propulsor section 14 includes an annular propulsor casing or a nacelle 50 that circumferentially surrounds the propulsor 38 and at least a portion of the turbo-engine 16. The nacelle 50 is supported relative to the turbo-engine 16 by a plurality of outlet guide vanes 52 that is circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the propulsor section 14. As the volume of air 58 passes across the propulsor blades 40, a first portion of air, also referred to as bypass air 62 is routed into the bypass airflow passage 56, and a second portion of air, also referred to as core air 64, is routed into the upstream section of the core air flow path through the core inlet 20 of the LP compressor 22. The pressure of the core air 64 is then increased, generating compressed air 65. The compressed air 65 is routed through the HP compressor 24 and into the combustion section 26, where the compressed air 65 is mixed with fuel and ignited to generate combustion gases 66.

The combustion gases 66 are routed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 (self-sustaining cycle). In this way, the combustion gases 66 do work on the HP turbine 28. The combustion gases 66 are then routed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the propulsor 38 via the gearbox assembly 46. In this way, the combustion gases 66 do work on the LP turbine 30.

The combustion gases 66 are subsequently routed through the jet exhaust nozzle section 32 of the turbo-engine 16 to provide propulsive thrust. Simultaneously, the bypass air 62 is routed through the bypass airflow passage 56 before being exhausted from a propulsor nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

A controller 90 is in communication with the turbine engine 10 for controlling aspects of the turbine engine 10. For example, the controller 90 is in two-way communication with the turbine engine 10 for receiving signals from various sensors and control systems of the turbine engine 10 and for controlling components of the turbine engine 10, as detailed further below. The controller 90, or components thereof, may be located onboard the turbine engine 10, onboard the aircraft, or can be located remote from each of the turbine engine 10 and the aircraft. The controller 90 can be a Full Authority Digital Engine Control (FADEC) that controls aspects of the turbine engine 10.

The controller 90 may be a standalone controller or may be part of an engine controller to operate various systems of the turbine engine 10. In this embodiment, the controller 90 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 90 to perform operations. The controller 90 and, more specifically, the one or more processors are programmed or configured to perform these operations, such as the operations discussed further below. In some embodiments, the instructions can be executed by the one or more processors to cause the one or more processors to complete any of the operations and functions for which the controller 90 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the propulsor 38 may be configured in any other suitable manner (e.g., as a fixed pitch propulsor) and further may be supported using any other suitable propulsor frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, or turboprop engines.

Figure 2:
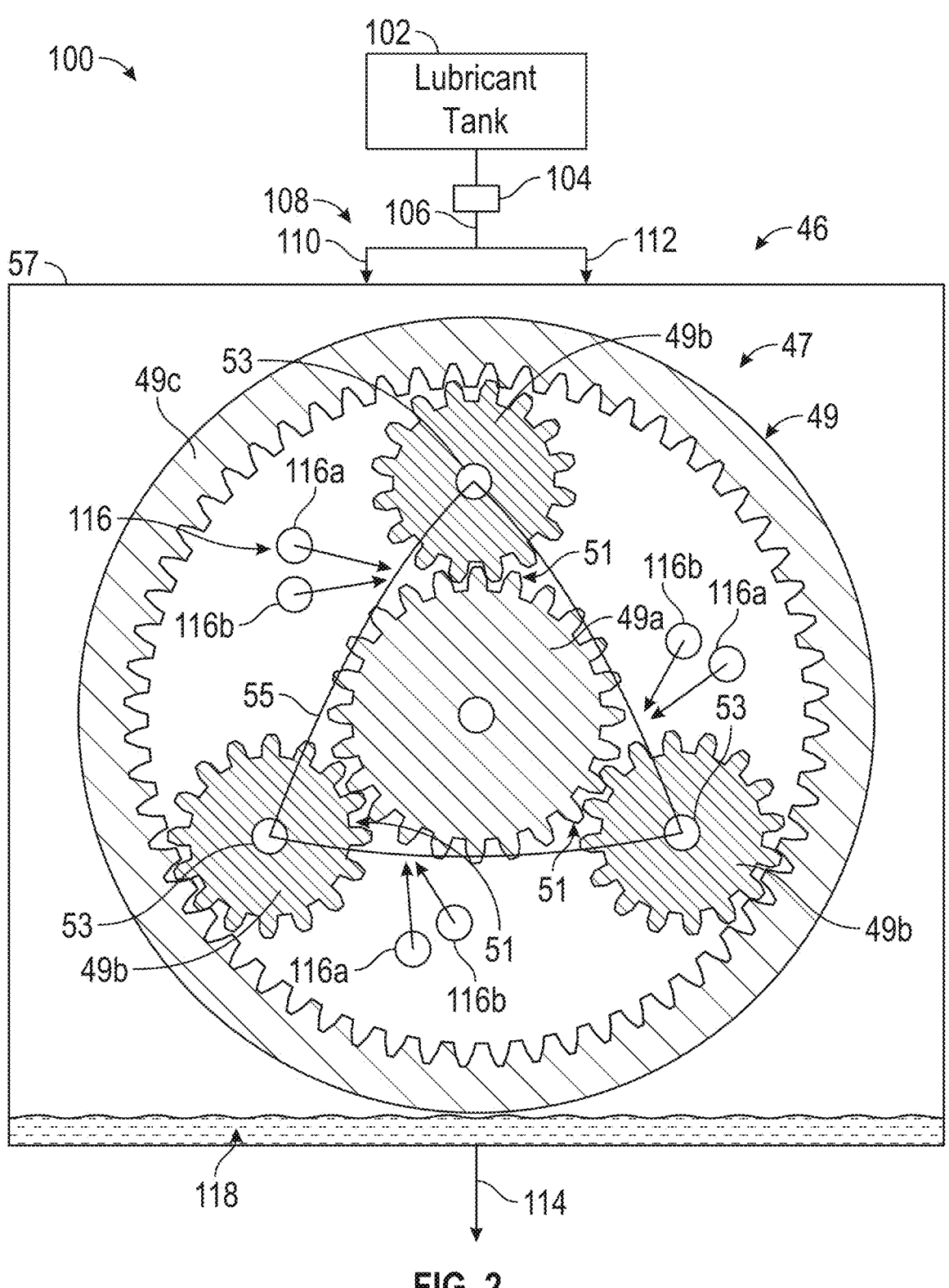
FIG. 2 is a schematic, axial end, cross-sectional view of a gearbox assembly and a portion of the lubrication system, taken at detail 2-2 in FIG. 1, according to the present disclosure.

FIG. 2 is a schematic, axial end, cross-sectional view of the gearbox assembly 46 and a portion of a lubrication system 100, taken at detail 2-2 in FIG. 1, according to the present disclosure. As shown in FIG. 2, the gearbox assembly 46 includes a gear assembly 47 having a plurality of gears 49. The gears 49 intermesh with each other at a mesh 51. At least one of the plurality of gears 49 includes one or more bearings 53 disposed within the at least one of the plurality of gears 49 such that the at least one of the plurality of gears 49 rotates with respect to the one or more bearings 53. In this embodiment, the one or more bearings 53 are roller bearings. The gear assembly 47 also includes a planet carrier 55. The gearbox assembly 46 includes a housing 57 that encloses at least a portion of the gear assembly 47.

The plurality of gears 49 of the gear assembly 47 includes a first gear 49a, a plurality of second gears 49b, and a third gear 49c. In FIG. 2, the first gear 49a is a sun gear, the second gears 49b are planet gears, and the third gear 49c is a ring gear. The gear assembly 47 is a star type or a rotating ring gear type gear assembly (e.g., the third gear 49c is rotating and the planet carrier 55 (shown schematically in FIG. 2) is fixed and stationary). In such an arrangement, the propulsor 38 (FIG. 1) is driven by the third gear 49c. In this way, the third gear 49c is an output of the gear assembly 47. While the gear assembly 47 is shown as an epicyclic gear assembly configuration, the gear assembly 47 can include any type of gear assembly configuration for transferring power and torque from an input to an output.

An input shaft is coupled to the first gear 49a. The input shaft is coupled to the turbine section 27 (FIG. 1) of the turbine engine 10. For example, the LP shaft 36 (FIG. 1) is the input shaft. In some embodiments, the HP shaft 34 (FIG. 1) is the input shaft. Radially outward of the first gear 49a, and intermeshing therewith, is the plurality of second gears 49b that is coupled together and supported by the planet carrier 55 (shown schematically). The first gear 49a and a respective second gear 49b are intermeshed at the mesh 51. The planet carrier 55 supports and constrains the plurality of second gears 49b such that the plurality of second gears 49b is enabled to rotate about its own corresponding axis without rotating about the periphery of the first gear 49a. Radially outwardly of the plurality of second gears 49b, and intermeshing therewith, is the third gear 49c, which is an annular ring gear. The third gear 49c is coupled via an output shaft to the propulsor 38 (FIG. 1) and rotates to drive rotation of the propulsor 38 (FIG. 1) about the longitudinal centerline axis 12. For example, the propulsor shaft 45 is the output shaft.

In operation, the input shaft (e.g., the LP shaft 36 or the HP shaft 34) rotates and causes the first gear 49a to rotate. The first gear 49a, being intermeshed with the plurality of second gears 49b at the mesh 51, causes the plurality of second gears 49b to rotate. The bearings 53 are disposed within the plurality of second gears 49b and are coupled to the planet carrier 55 such that the plurality of second gears 49b rotates with respect to the bearings 53. The third gear 49c rotates in the embodiment of FIG. 2, as detailed above. In some embodiments, the third gear 49c is stationary, and the plurality of second gears 49 rotates with respect to the longitudinal centerline axis 12 such that the plurality of second gears 49 is the output of the gearbox assembly 46.

The lubrication system 100 includes a lubricant tank 102, a lubricant pump 104, and one or more lubricant supply lines 106. The lubricant tank 102 includes a tank, a reservoir, or a sump for storing lubricant (e.g., oil) therein and supplies the lubricant to the turbine engine 10 (FIG. 1) or the gearbox assembly 46 through the one or more lubricant supply lines 106. The lubricant pump 104 is in fluid communication with the lubricant tank 102 and the one or more lubricant supply lines 106. While the lubrication system 100 is described herein for a power gearbox that transfers power and torque from the turbo-engine 16 (FIG. 1) to the fan 38 (FIG. 1), the lubrication system 100 can be utilized for other types of gearboxes, including, for example, an accessory gearbox assembly, or the like.

The lubrication system 100 includes a gearbox lubrication system 108. The gearbox lubrication system 108 supplies the lubricant to the gearbox assembly 46 for lubricating the gear assembly 47. In particular, the gearbox lubrication system 108 supplies the lubricant to at least one of the mesh 51 or the bearings 53 of the plurality of gears 49. The gearbox lubrication system 108 includes one or more primary gearbox lubricant supply lines 110 and one or more secondary gearbox lubricant supply lines 112.

The primary gearbox lubricant supply lines 110 are in fluid communication with the one or more lubricant supply lines 106 and the gearbox assembly 46 for supplying the lubricant to the gearbox assembly 46 from the lubricant tank 102. In some embodiments, the primary gearbox lubricant supply lines 110 are fluidly coupled to the lubricant supply lines 106. In some embodiments, the primary gearbox lubricant supply lines 110 embody a portion of the lubricant supply lines 106 (e.g., as branches of the lubricant supply lines 106).

The one or more secondary gearbox lubricant supply lines 112 are in fluid communication with lubricant supply lines 106 and the gearbox assembly 46 for supplying the lubricant to the gearbox assembly 46 from the lubricant tank 102. In some embodiments, the secondary gearbox lubricant supply lines 112 are fluidly coupled to the lubricant supply lines 106. In some embodiments, the secondary gearbox lubricant supply lines 112 embody a portion of the lubricant supply lines 106 (e.g., as branches of the lubricant supply lines 106).

The gearbox lubrication system 108 also includes one or more gearbox lubricant return lines 114, one or more gearbox lubricant injectors 116, and a sump 118. The gearbox lubricant return lines 114 are in fluid communication with the gearbox assembly 46 and the lubricant tank 102 for returning the lubricant that drains from the gear assembly 47 (e.g., the mesh 51 or the bearings 53) to the lubricant tank 102.

The gearbox lubricant injectors 116 are in fluid communication with the primary gearbox lubricant supply lines 110 and the secondary gearbox lubricant supply lines 112 to inject the lubricant to the gear assembly 47. In particular, the gearbox lubricant injectors 116 are positioned to inject the lubricant to at least one of the mesh 51 or the lubricant to the bearings 53. For example, one or more of the gearbox lubricant injectors 116 can be positioned to inject the lubricant to the mesh 51 and one or more of the gearbox lubricant injectors 116 can be positioned to inject the lubricant to the bearings 53.

The gearbox lubricant injectors 116 include one or more primary gearbox lubricant injectors 116a in fluid communication with the primary gearbox lubricant supply lines 110 and one or more secondary gearbox lubricant injectors 116b in fluid communication with the secondary gearbox lubricant supply lines 112. In some embodiments, the primary gearbox lubricant injectors 116a and the secondary gearbox lubricant injectors 116b are sized the same (e.g., same diameter). In some embodiments, the primary gearbox lubricant injectors 116a and the secondary gearbox lubricant injectors 116b are sized differently (e.g., different diameters).

The sump 118 is a reservoir within the housing 57 that collects the lubricant that drains from the gear assembly 47 or from the bearings 53 of the gear assembly 47. The sump 118 is in fluid communication with the gearbox lubricant return line 114 for draining the lubricant from the sump 118. In this way, the gearbox lubrication system 108 includes the sump 118.

In operation, the lubricant pump 104 pumps the lubricant from the lubricant tank 102 to the one or more rotating components of the turbine engine 10 (FIG. 1) or to the gearbox assembly 46 through the one or more lubricant supply lines 106 for lubricating the one or more rotating components or the gear assembly 47. The one or more primary gearbox lubricant supply lines 110 and the one or more secondary gearbox lubricant supply lines 112 direct the lubricant to the gear assembly 47 (e.g., to the mesh 51 or to the bearings 53). In particular, the primary gearbox lubricant injectors 116a and the secondary gearbox lubricant injectors 116b inject the lubricant to the gear assembly 47. The lubrication system 100 supplies the lubricant to the turbine engine 10 or to the gearbox assembly 46 at a mass flow rate. In the embodiment of FIG. 2, the lubrication system 100 modulates the mass flow rate to the gearbox assembly 46 based on operating conditions of the turbine engine 10, as detailed further below.

The lubricant drains from the gear assembly 47 into the sump 118. The gearbox lubricant return line 114 directs the lubricant from the sump 118 back to the lubricant tank 102. For example, the lubricant pump 104 (or a separate pump) pumps the lubricant through the gearbox lubricant return line 114 and re-circulates the lubricant to the lubricant tank 102. In this way, the lubricant can be re-used to lubricate the plurality of gears 49 of the gear assembly 47 (e.g., the mesh 51), the bearings 53, other components of the gearbox assembly 46, or the rotating components of the turbine engine 10.

Figure 3:
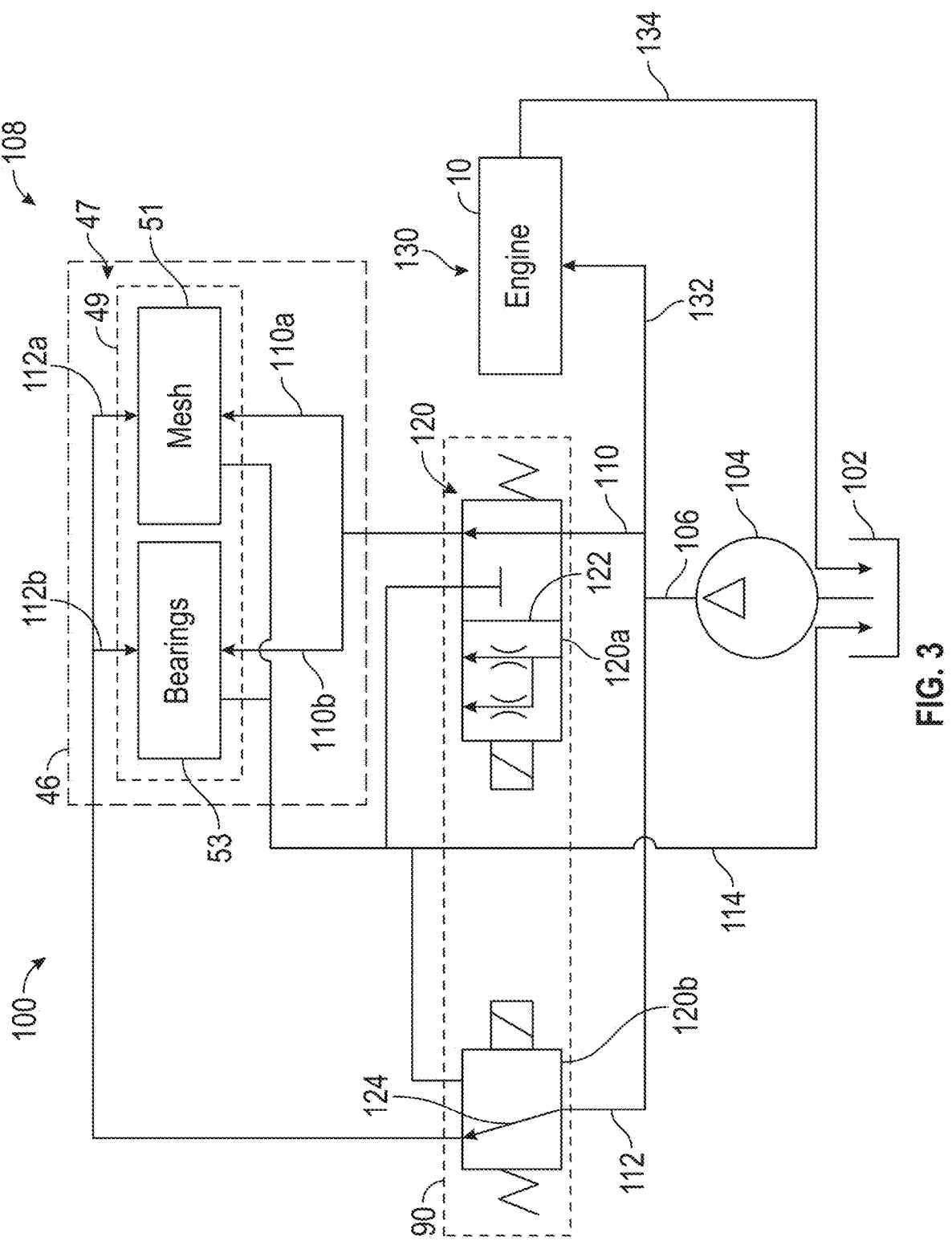
FIG. 3 is a schematic diagram of the lubrication system of FIG. 2, according to the present disclosure.

FIG. 3 is a schematic diagram of the lubrication system 100 for the turbine engine 10, according to the present disclosure. As shown in FIG. 3, the one or more primary gearbox lubricant supply lines 110 include a first primary gearbox lubricant supply line 110a and a second primary gearbox lubricant supply line 110*b*. The first primary gear-
box lubricant supply line 110*a* is in fluid communication
with the mesh 51 for supplying the lubricant to the mesh 51.
The second primary gearbox lubricant supply line 110*b* is in
fluid communication with the bearings 53 for supplying the
lubricant to the bearings 53.

The one or more secondary gearbox lubricant supply lines
112 include a first secondary gearbox lubricant supply line
112*a* and a second secondary gearbox lubricant supply lines
112*b*. The first secondary gearbox lubricant supply line 112*a*
is in fluid communication with the mesh 51 for supplying the
lubricant to the mesh 51. The second secondary gearbox
lubricant supply line 112*b* is in fluid communication with the
bearings 53 for supplying the lubricant to the bearings 53.

The gearbox lubrication system 108 includes one or more
valves 120 disposed in the one or more lubricant supply lines
106 for modulating a flow of the lubricant to the gearbox
assembly 46. In particular, the one or more valves 120
include a primary valve 120*a* and a secondary valve 120*b*.
The primary valve 120*a* is in fluid communication with the
primary gearbox lubricant supply lines 110. The secondary
valve 120*b* is in fluid communication with the secondary
gearbox lubricant supply lines 112. The valves 120 can
include at least one of the primary valve 120*a* or the
secondary valve 120*b*. For example, the valves 120 can
include only the primary valve 120*a*, only the secondary
valve 120*b*, or both the primary valve 120*a* and the second-
ary valve 120*b*.

The primary valve 120*a* is a proportional modulating
valve (PMV) that includes a primary valve member 122 that
moves between a fully opened positioned and a fully closed
position to modulate the flow of the lubricant through the
primary gearbox lubricant supply lines 110. The primary
valve 120*a* is a control valve that is controlled by the
controller 90. In particular, the primary valve 120*a* is in
communication with the controller 90 such that the control-
ler 90 controls the primary valve 120*a* to move the primary
valve member 122 between the fully opened position and the
fully closed position, as detailed further below. In some
embodiments, the primary valve 120*a* can be a passive valve
that is controlled by, for example, the pressure of the
lubricant, rather than by the controller 90. In the fully
opened position, the primary valve 120*a* allows the lubricant
to fully flow through the primary gearbox lubricant supply
lines 110. In the fully closed position, the primary valve
120*a* prevents the lubricant from flowing through the pri-
mary gearbox lubricant supply lines 110. The primary valve
120*a* can move the primary valve member 122 anywhere
between the fully opened position and the fully closed
position to modulate the flow of the lubricant through the
primary gearbox lubricant supply lines 110.

The secondary valve 120*b* is a shut-off valve (SOV) that
includes a secondary valve member 124 that moves between
an opened position and a closed position. The secondary
valve 120*b* is a control valve that is controlled by the
controller 90. In particular, the secondary valve 120*b* is in
communication with the controller 90 such that the control-
ler 90 controls the secondary valve 120*b* to move the
secondary valve member 124 between the opened position
and the closed position. In some embodiments, the second-
ary valve 120*b* can be a passive valve that is controlled by,
for example, the pressure of the lubricant, rather than by the
controller 90. In the opened position, the secondary valve
120*b* allows the lubricant to fully flow through the second-
ary gearbox lubricant supply lines 112. In the closed position, the secondary valve 120*b* prevents the lubricant from
flowing through the secondary gearbox lubricant supply
lines 112.

The lubrication system 100 also includes a turbine engine
lubrication system 130. The turbine engine lubrication sys-
tem 130 supplies the lubricant to one or more rotating
components of the turbine engine 10. The one or more
rotating components include at least one of the HP shaft 34
(FIG. 1), the LP shaft 36 (FIG. 1), or one or more turbine
engine bearings, or one or more dampers. The turbine engine
lubrication system 130 includes one or more turbine engine
lubricant supply lines 132 in fluid communication with the
one or more lubricant supply lines 106 and the one or more
rotating components of the turbine engine 10 for supplying
the lubricant to the one or more rotating components from
the lubricant tank 102. In some embodiments, the one or
more turbine engine lubricant supply lines 132 are fluidly
coupled to the one or more lubricant supply lines 106. In
some embodiments, the one or more turbine engine lubricant
supply lines 132 embody a portion of the one or more
lubricant supply lines 106 (e.g., as branches of the one or
more lubricant supply lines 106). The turbine engine lubri-
cation system 130 can also include one or more turbine
engine lubricant return lines 134 for returning the lubricant
to the lubricant tank 102 after draining from the rotating
components.

In operation, the lubrication system 100 modulates the
flow of the lubricant to the gearbox assembly 46. In par-
ticular, the controller 90 controls the primary valve 120*a*
based on at least one of a gearbox inlet pressure (e.g., a
pressure of the lubricant at an inlet of the gearbox assembly
46), a turbine engine delivery pressure (e.g., a pressure of the
lubricant flowing through the turbine engine lubrication
system 130), a turbine engine speed (e.g., a speed of the
turbo-engine 16 (FIG. 1)), a gearbox lubricant temperature
(e.g., a temperature of the lubricant in the gearbox assembly
46, for example, in a scavenge reservoir of the gearbox
assembly 46), or an input torque or an output torque of the
gearbox assembly 46. The controller 90 can also control the
primary valve 120*a* based on at least one of turbine engine
power (e.g., a power output from the turbo-engine 16), a
turbine engine pressure (e.g., a pressure in the compressor
section 21 (FIG. 1)), or a turbine engine temperature (e.g.,
a temperature in the compressor section 21).

The controller 90 controls the secondary valve 120*b* based
on at least one of the turbine engine power, the turbine
engine speed, the turbine engine pressure, or a turbine
engine temperature. The controller 90 can also control the
secondary valve 120*b* based on at least one of the gearbox
inlet pressure, the turbine engine delivery pressure, the
turbine engine speed, the gearbox lubricant temperature, or
the input torque or the output torque of the gearbox assembly
46.

During the high-power operation (e.g., the turbine engine
speed or the turbine engine power is greater than a thresh-
old), the primary valve 120*a* is in the fully opened position
and the secondary valve 120*b* is in the opened position. In
this way, the lubricant flows at a first mass flow rate ($\dot{m}_1$)
through the primary gearbox lubricant supply lines 110 to
the gearbox assembly 46 (e.g., through the first primary
gearbox lubricant supply line 110*a* to the mesh 51 and
through the second primary gearbox lubricant supply line
110*b* to the bearings 53). The first mass flow rate is at a
maximum first mass flow rate ($\dot{m}_1$) when the primary valve
120*a* is in the fully opened position. Similarly, the lubricant
flows at a second mass flow rate ($\dot{m}_2$) through the secondary
gearbox lubricant supply lines 112 (through the first secondary gearbox lubricant supply line 112a to the mesh 51 and through the second secondary gearbox lubricant supply line 112b to the bearings 53). The second mass flow rate ($\dot{m}_2$) is at a maximum when the secondary valve 120b is in the opened position. In this way, the lubricant flows at a total mass flow rate ($\dot{m}_{total}$) to the gearbox assembly 46 that is a sum of the first mass flow ($\dot{m}_1$) and the second mass flow rate ($\dot{m}_2$). The total mass flow rate ($\dot{m}_{total}$) is at a maximum total mass flow rate when the primary valve 120a is in the fully opened position and the secondary valve 120b is in the opened position.

During the low-power operation or the mid-power operation (e.g., the turbine engine speed or the turbine engine power is less than a threshold), the primary valve 120a is in a partially opened position (e.g., between the fully opened position and the fully closed position) and the secondary valve 120b is in the closed position. In this way, the first mass flow rate ($\dot{m}_1$) of the lubricant through the primary gearbox lubricant supply lines 110 to the gearbox assembly 46 is less than the maximum first mass flow rate (and greater than zero) in the partially opened position. The second mass flow rate ($\dot{m}_2$) of the lubricant through the secondary gearbox lubricant supply lines 112 is zero in the closed position. In this way, the total mass flow rate ($\dot{m}_{total}$) of the lubricant to the gearbox assembly 46 is less than the maximum total mass flow rate. The primary valve 120a directs a portion of the lubricant to the lubricant tank 102 and directs a portion of the lubricant to the gearbox assembly 46 through the primary gearbox lubricant supply lines 110 when the primary valve 120a is in the partially opened position. The secondary valve 120b directs the lubricant to the lubricant tank 102 (through the gearbox lubricant return lines 114) and prevents the lubricant from flowing to the gearbox assembly 46 through the secondary gearbox lubricant supply lines 112 when the secondary valve 120b is in the closed position. In this way, the total mass flow rate ($\dot{m}_{total}$) of the lubricant to the gearbox assembly 46 is equal to the first mass flow rate ($\dot{m}_1$) when the secondary valve 120b is in the closed position. The controller 90 can control the primary valve 120a to modulate the flow of the lubricant through the primary gearbox lubricant supply lines 110 by moving the primary valve member 122 between the fully opened position and the fully closed position during the low-power conditions. In some embodiments, the primary valve 120a or the secondary valve 120b can be excluded. For example, the lubrication system 100 can include only the primary valve 120a, and not the secondary valve 120b, such that the lubrication system 100 modulates the flow of the lubricant with only the primary valve 120a. In some embodiments, the lubrication system 100 can include only the secondary valve 120b, and not the primary valve 120a, such that the lubrication system 100 modulates the flow of the lubricant with only the secondary valve 120b. In some embodiments, the lubrication system 100 modulates the mass flow rate only to the mesh 51, such that the mass flow rate is not modulated to the bearings 53. In this way, the mass flow rate of the lubricant to the bearings 53 is linear with the speed of the lubricant pump 104.

The present disclosure provides for a method of operating the turbine engine 10 including operating the lubrication system 100. In particular, the method of operating the turbine engine 10 and the lubrication system 100 includes the operations discussed above.

Figure 4:
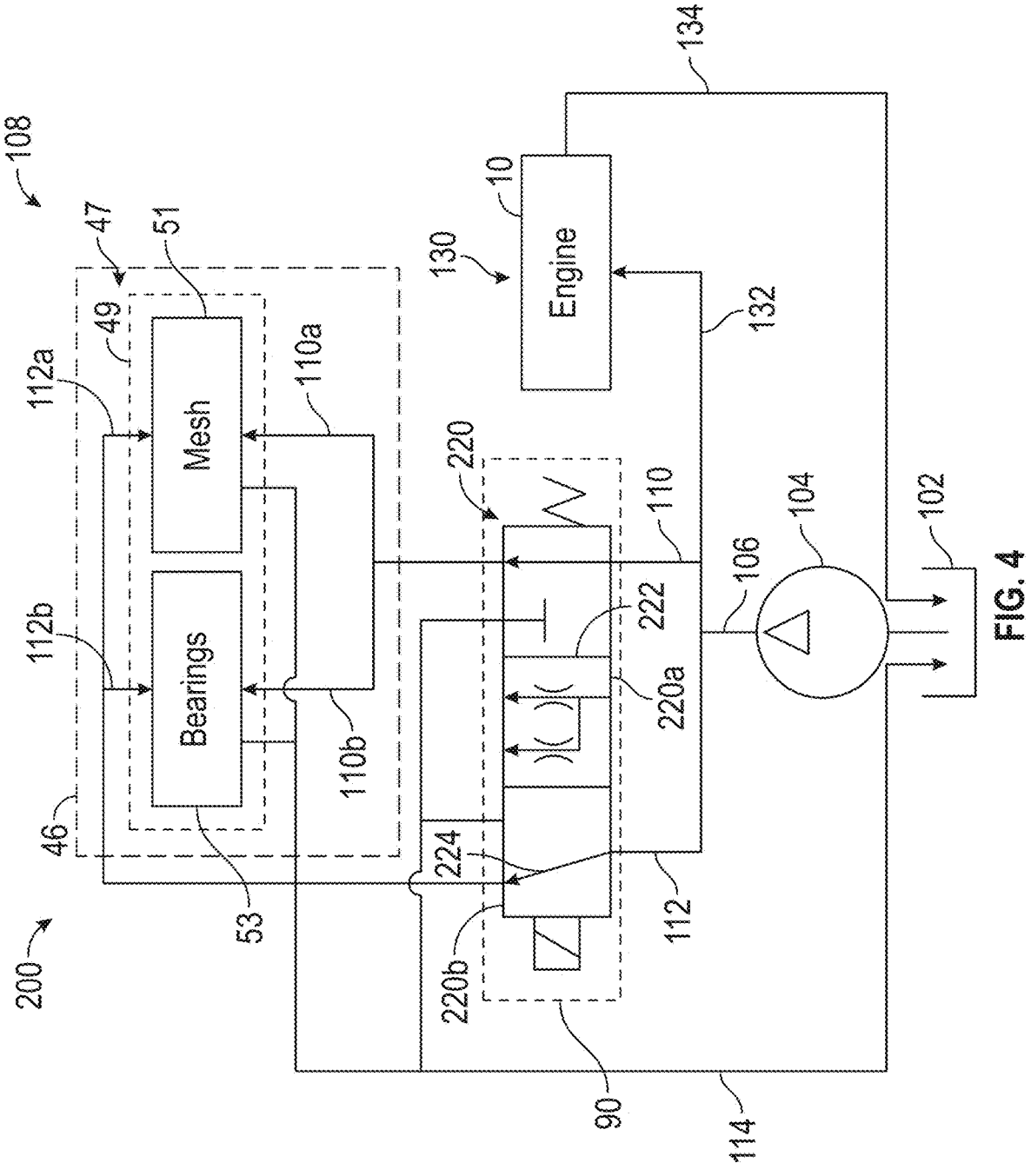
FIG. 4 is a schematic diagram of a lubrication system for the turbine engine of FIG. 1, according to another embodiment.

FIG. 4 is a schematic diagram of a lubrication system 200 for the turbine engine 10 (FIG. 1), according to another embodiment. The lubrication system 200 is substantially similar to the lubrication system 100 of FIGS. 2 and 3. The same reference numerals or similar reference numerals will be used for components of the lubrication system 200 that are the same as or similar to the components of the lubrication system 100 discussed above. The description of these components above also applies to this embodiment, and a detailed description of these components is omitted here.

The lubrication system 200 includes one or more valves 220. The one or more valves 220 each includes a primary valve 220a and a secondary valve 220b. In this way, the primary valve 220a and the secondary valve 220b form a single, unitary valve in FIG. 4. The primary valve 220a includes a primary valve member 222. The secondary valve 220b includes a secondary valve member 224. The primary valve 220a and the secondary valve 220b operate similar to the primary valve 120a and the secondary valve 120b in FIG. 3, respectively, to modulate the mass flow rate of the lubricant to the gearbox assembly 46.

The present disclosure provides for a method of operating the turbine engine 10 including operating the lubrication system 200. In particular, the method of operating the turbine engine 10 and the lubrication system 200 includes the operations discussed above.

Figure 5:
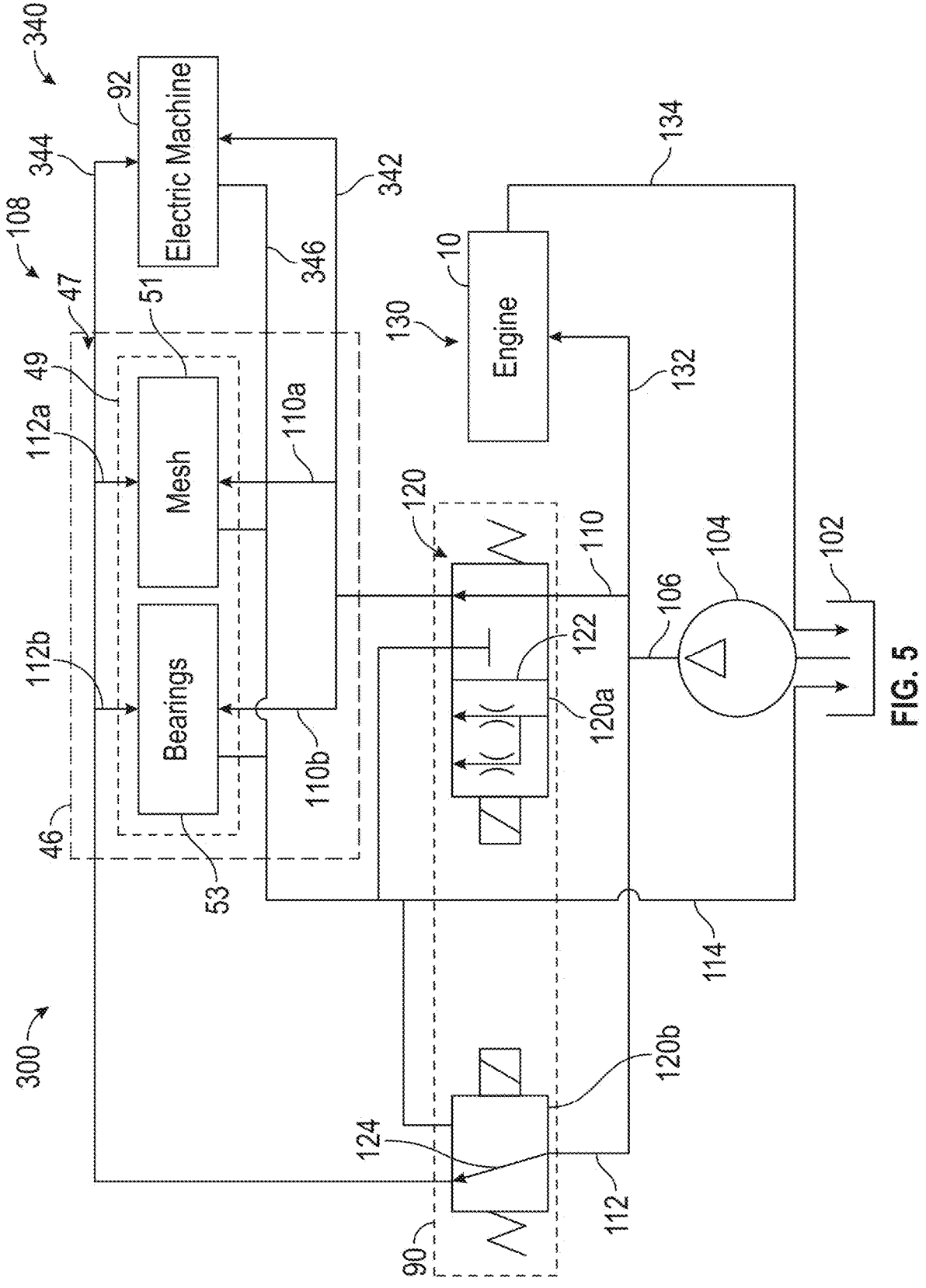
FIG. 5 is a schematic diagram of a lubrication system for the turbine engine of FIG. 1, according to another embodiment.

FIG. 5 is a schematic diagram of a lubrication system 300 for the turbine engine of FIG. 1, according to another embodiment. The lubrication system 300 is substantially similar to the lubrication system 100 of FIGS. 2 and 3. The same reference numerals or similar reference numerals will be used for components of the lubrication system 300 that are the same as or similar to the components of the lubrication system 100 discussed above. The description of these components above also applies to this embodiment, and a detailed description of these components is omitted here.

As shown in FIG. 5, the turbine engine 10 (FIG. 1) includes an electric machine 92. The electric machine 92 can be drivingly coupled to one of the shafts of the turbine engine 10, for example, the LP shaft 36 (FIG. 1) or the HP shaft 34 (FIG. 1). In this way, the turbine engine 10 is a hybrid electric turbine engine. The electric machine 92 can be used in many different power configurations.

In one form, the electric machine 92 can operate as a generator that is configured to extract mechanical power from the turbine engine 10 (e.g., from the LP shaft 36 of the HP shaft 34). The electric machine 92 converts the mechanical power to electric power. The extraction of mechanical power from the LP shaft 36 and conversion to electric power can be used to charge an on-board power storage device such as a battery, or alternatively, to provide electric power to another electrical device (e.g., an electric motor, an electrical accessory on an aircraft, etc.).

In other forms, the electric machine 92 can operate as a motor to provide power to the turbine engine 10 (e.g., to the LP shaft 36 or the HP shaft 34) to supplement power extracted by the LP turbine 30 from the combustion gases 66. In these forms, the electric machine 92 can be configured to provide a minimum of 10% of supplemental thrust to the turbine engine 10, a minimum of 20% of supplemental thrust to the turbine engine 10, and up to 40% of supplemental thrust to the turbine engine 10 in various embodiments. In still other forms, the electric machine 92 can be configured to drive 100% of thrust from the propulsor section 14. A scenario in which the electric machine 92 provides all power to the propulsor section 14 can include shutdown of the turbine engine 10. In one non-limiting example of the turbine engine 10 being shut down, upon, or near, landing, the controller 90 can command the turbo-engine 16 to shut down and command the electric machine 92 to drive further propulsor thrust requirements, such as, for example, power when the propulsor section 14 is configured in reverse pitch to aid in slowing the aircraft.

The lubrication system 300 includes an electric machine lubrication system 340 for supplying the lubricant to the electric machine 92 to lubricate or to cool one or more rotating components of the electric machine 92. The electric machine lubrication system 340 includes one or more primary electric machine lubricant supply lines 342 and one or more secondary electric machine lubricant supply lines 344 that are in fluid communication with the lubricant tank 102 and the electric machine 92. The electric machine 92 also includes one or more electric machine lubricant return lines 346 for returning the lubricant from the electric machine 92 to the lubricant tank 102.

The electric machine lubrication system 340 is in fluid communication with the gearbox lubrication system 108. In particular, the primary electric machine lubricant supply lines 342 are in fluid communication with the primary gearbox lubricant supply lines 110. The secondary electric machine lubricant supply lines 344 are in fluid communication with the secondary gearbox lubricant supply lines 112. The electric machine lubricant return lines 346 are in fluid communication with the gearbox lubricant return lines 114. In this way, the one or more valves 120 can modulate the mass flow rate of the lubricant to the electric machine 92, similar to the one or more valves 120 modulating the mass flow rate of the lubricant to the gearbox assembly 46. In some embodiments, the electric machine lubrication system 340 can be directly fluidly coupled with the lubricant tank 102 without being in fluid communication with the gearbox lubrication system 108. In such embodiments, the one or more valves are disposed in at least one of the primary electric machine lubricant supply lines 342 or the secondary electric machine lubricant supply lines 344. In particular, the primary valve 120a can be disposed in the primary electric machine lubricant supply lines 342. The secondary valve 120b can be disposed in the secondary electric machine lubricant supply lines 344.

In operation, the lubrication system 300 supplies the lubricant to the electric machine 92 at a mass flow rate. In the embodiment of FIG. 5, the lubrication system 300 modulates the mass flow rate to the electric machine 92 based on operating conditions of the turbine engine 10. In particular, the controller 90 controls the primary valve 120a and the secondary valve 120b, as detailed above with respect to FIG. 3, to modulate the mass flow rate of the lubricant to the electric machine 92.

The present disclosure provides for a method of operating the turbine engine 10 including operating the lubrication system 300. In particular, the method of operating the turbine engine 10 and the lubrication system 300 includes the operations discussed above.

Figure 6:
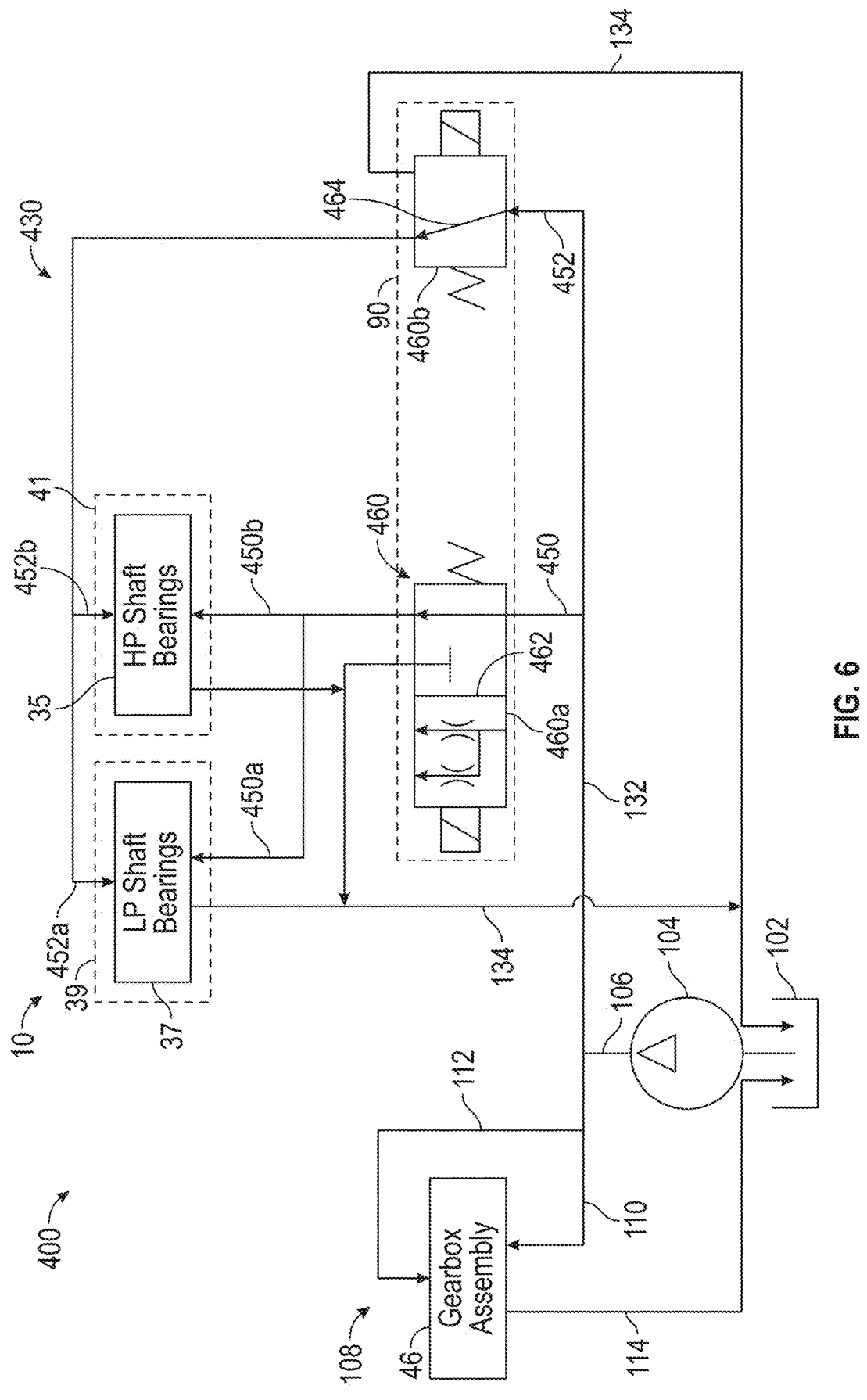
FIG. 6 is a schematic diagram of a lubrication system for the turbine engine of FIG. 1, according to another embodiment.

FIG. 6 is a schematic diagram of a lubrication system 400 for the turbine engine 10 of FIG. 1, according to another embodiment. The lubrication system 400 is substantially similar to the lubrication system 100 of FIG. 2. The same reference numerals or similar reference numerals will be used for components of the lubrication system 400 that are the same as or similar to the components of the lubrication system 100 discussed above. The description of these components above also applies to this embodiment, and a detailed description of these components is omitted here.

As shown in FIG. 6, the turbine engine 10 includes one or more LP shaft sumps 39 and one or more HP shaft sumps 41. The LP shaft sumps 39 are in fluid communication with the LP shaft bearings 37. The HP shaft sumps 41 are in fluid communication with the HP shaft bearings 35. The LP shaft sumps 39 collect the lubricant that drains from the LP shaft bearings 37. The HP shaft sumps 41 collect the lubricant that drains from the HP shaft bearings 35.

The lubrication system 400 includes a turbine engine lubrication system 430 including the turbine engine lubricant supply lines 132 and the turbine engine lubricant return lines 134. The turbine engine lubricant supply lines 132 include one or more primary turbine engine lubricant supply lines 450 and one or more secondary turbine engine lubricant supply lines 452.

The one or more primary turbine engine lubricant supply lines 450 include a first primary turbine engine lubricant supply line 450a and a second primary turbine engine lubricant supply line 450b. The first primary turbine engine lubricant supply line 450a is in fluid communication with the LP shaft bearings 37 for supplying the lubricant to the LP shaft bearings 37. The second primary turbine engine lubricant supply line 450b is in fluid communication with the HP shaft bearings 35 for supplying the lubricant to the HP shaft bearings 35.

The one or more secondary turbine engine lubricant supply lines 452 include a first secondary turbine engine lubricant supply line 452a and a second secondary turbine engine lubricant supply lines 452b. The first secondary turbine engine lubricant supply line 452a is in fluid communication with the LP shaft bearings 37 (FIG. 1) for supplying the lubricant to the LP shaft bearings 37. The second secondary turbine engine lubricant supply line 452b is in fluid communication with the HP shaft bearings 35 (FIG. 1) for supplying the lubricant to the HP shaft bearings 35.

The turbine engine lubrication system 430 includes one or more valves 460 disposed in the one or more lubricant supply lines 106 for modulating a flow of the lubricant to the turbine engine 10 (e.g., the LP shaft bearings 37 and the HP shaft bearings 35). In particular, the one or more valves 460 includes a primary valve 460a and a secondary valve 460b. The primary valve 460a is in fluid communication with the primary turbine engine lubricant supply lines 450. The secondary valve 460b is in fluid communication with the secondary turbine engine lubricant supply lines 452. The valves 460 can include at least one of the primary valve 460a or the secondary valve 460b. For example, the valves 460 can include only the primary valve 460a, only the secondary valve 460b, or both the primary valve 460a and the secondary valve 460b.

The primary valve 460a is a proportional modulating valve (PMV) that includes a primary valve member 462 that moves between a fully opened positioned and a fully closed position to modulate the flow of the lubricant through the primary turbine engine lubricant supply lines 450. The primary valve 460a is a control valve that is controlled by the controller 90. In particular, the primary valve 460a is in communication with the controller 90 such that the controller 90 controls the primary valve 460a to move the primary valve member 462 between the fully opened position and the fully closed position, as detailed further below. In some embodiments, the primary valve 460a can be a passive valve that is controlled by, for example, the pressure of the lubricant, rather than by the controller 90. In the fully opened position, the primary valve 460a allows the lubricant to fully flow through the primary turbine engine lubricant supply lines 450. In the fully closed position, the primary valve 460a prevents the lubricant from flowing through the primary turbine engine lubricant supply lines 450. The primary valve 460a can move the primary valve member

462 anywhere between the fully opened position and the fully closed position to modulate the flow of the lubricant through the primary turbine engine lubricant supply lines 450.

The secondary valve 460*b* is a shut-off valve (SOV) that includes a secondary valve member 464 that moves between an opened position and a closed position. The secondary valve 460*b* is a control valve that is controlled by the controller 90. In particular, the secondary valve 460*b* is in communication with the controller 90 such that the controller 90 controls the secondary valve 460*b* to move the secondary valve member 464 between the opened position and the closed position. In some embodiments, the secondary valve 460*b* can be a passive valve that is controlled by, for example, the pressure of the lubricant, rather than by the controller 90. In the opened position, the secondary valve 460*b* allows the lubricant to fully flow through the secondary turbine engine lubricant supply lines 452. In the closed position, the secondary valve 460*b* prevents the lubricant from flowing through the secondary turbine engine lubricant supply lines 452.

The turbine engine lubricant return lines 134 are in fluid communication with the LP shaft bearings 37 and the HP shaft bearings 35 for returning the lubricant to the lubricant tank 102. In particular, the LP shaft sumps 39 and the HP shaft sumps 41 are in fluid communication with the turbine engine lubricant return lines 134 for returning the lubricant to the lubricant tank 102 from the LP shaft sumps 39 and the HP shaft sumps 41.

In operation, the lubrication system 400 modulates the flow of the lubricant to the turbine engine 10, similar to the modulation of the lubricant to the gearbox assembly 46 as detailed above with respect to FIG. 3.

During the high-power operation (e.g., the rotational speed of the at least one of the HP shaft 34 or the LP shaft 36 is greater than a threshold), the primary valve 460*a* is in the fully opened position and the secondary valve 460*b* is in the opened position. In this way, the lubricant flows at a first mass flow rate ($\dot{m}_1$) through the primary turbine engine lubricant supply lines 450 to the turbine engine 10 (e.g., through the first primary turbine engine lubricant supply line 450*a* to the LP shaft bearings 37 and through the second primary turbine engine lubricant supply line 450*b* to the HP shaft bearings 35). The first mass flow rate is at a maximum first mass flow rate ($\dot{m}_1$) when the primary valve 460*a* is in the fully opened position. Similarly, the lubricant flows at a second mass flow rate ($\dot{m}_2$) through the secondary turbine engine lubricant supply lines 452 (through the first secondary turbine engine lubricant supply line 452*a* to the LP shaft bearings 37 and through the second secondary turbine engine lubricant supply line 452*b* to the HP shaft bearings 35). The second mass flow rate ($\dot{m}_2$) is at a maximum when the secondary valve 460*b* is in the opened position. In this way, the lubricant flows at a total mass flow rate ($\dot{m}_{total}$) to the turbine engine 10 that is a sum of the first mass flow ($\dot{m}_1$) and the second mass flow rate ($\dot{m}_2$). The total mass flow rate ($\dot{m}_{total}$) is at a maximum total mass flow rate when the primary valve 460*a* is in the fully opened position and the secondary valve 460*b* is in the opened position.

During the low-power operation or the mid-power operation (e.g., the rotational speed of the at least one of the HP shaft 34 or the LP shaft 36 is less than a threshold), the primary valve 460*a* is in a partially opened position (e.g., between the fully opened position and the fully closed position) and the secondary valve 460*b* is in the closed position. In this way, the first mass flow rate ($\dot{m}_1$) of the lubricant through the primary turbine engine lubricant supply lines 450 to the turbine engine 10 is less than the maximum first mass flow rate (and greater than zero) in the partially opened position. The second mass flow rate ($\dot{m}_2$) of the lubricant through the secondary turbine engine lubricant supply lines 452 is zero in the closed position. In this way, the total mass flow rate ($\dot{m}_{total}$) of the lubricant to the turbine engine 10 is less than the maximum total mass flow rate. The primary valve 460*a* directs a portion of the lubricant to the lubricant tank 102 (e.g., through the turbine engine lubricant return lines 134) and directs a portion of the lubricant to the turbine engine 10 through the primary turbine engine lubricant supply lines 450 when the primary valve 460*a* is in the partially opened position. The secondary valve 460*b* directs the lubricant to the lubricant tank 102 (through the turbine engine lubricant return lines 134) and prevents the lubricant from flowing to the turbine engine 10 through the secondary turbine engine lubricant supply lines 452 when the secondary valve 460*b* is in the closed position. In this way, the total mass flow rate ($\dot{m}_{total}$) of the lubricant to the turbine engine 10 is equal to the first mass flow rate ($\dot{m}_1$) when the secondary valve 460*b* is in the closed position. The controller 90 can control the primary valve 460*a* to modulate the flow of the lubricant through the primary turbine engine lubricant supply lines 450 by moving the primary valve member 462 between the fully opened position and the fully closed position during the low-power conditions. In some embodiments, the primary valve 460*a* or the secondary valve 460*b* can be excluded. For example, the lubrication system 400 can include only the primary valve 460*a*, and not the secondary valve 460*b*, such that the lubrication system 400 modulates the flow of the lubricant to the turbine engine 10 with only the primary valve 460*a*. In some embodiments, the lubrication system 400 can include only the secondary valve 460*b*, and not the primary valve 460*a*, such that the lubrication system 400 modulates the flow of the lubricant with only the secondary valve 460*b*.

Thus, the lubrication systems 100, 200, 300, and 400 provide an amount of the lubricant and a temperature of the lubricant for reducing damage to the gear assembly 47, while minimizing gearbox losses (e.g., due to friction and windage of the plurality of gears 49) and maximizing the gearbox efficiency for all operating conditions of the gearbox assembly 46 over the entire operating cycle of the turbine engine 10 by modulating the lubricant flow to the gearbox assembly 46. The lubrication system 300 similarly reduces damage to the rotating components of the electric machine 92 while minimizing losses and maximizing efficiency of the electric machine 92 over the entire operating cycle of the turbine engine 10 by modulating the lubricant flow to the electric machine 92. The lubrication system 400 reduces damage to the LP shaft bearings 37 or the HP shaft bearings 35 (or LP shaft dampers or HP shaft dampers), while minimizing losses and maximizing efficiency of the bearings 35 and 37 over the entire operating cycle of the turbine engine 10 by modulating the lubricant flow to the bearings 35 and 37 (or to the dampers). Further, having two lubricant supply lines allows for the lubricant flow to scale linearly with the engine speed by reducing the number of orifices (e.g., the total orifice area) when one line is turned off, while also allowing the lubricant to be modulated.

The present disclosure provides for a method of operating the turbine engine 10 including operating the lubrication system 400. In particular, the method of operating the turbine engine 10 and the lubrication system 400 includes the operations discussed above.

Further aspects of the present disclosure are provided by the subject matter of the following clauses.

A turbine engine comprises a turbo-engine including a compressor section, a combustor, and a turbine section, the turbo-engine having an input shaft that couples the compressor section to the turbine section, a gearbox assembly including a gear assembly having a plurality of gears, a propulsor having an output shaft drivingly coupled to the input shaft through the gear assembly, and a lubrication system comprising a lubricant tank that stores lubricant therein, one or more primary gearbox lubricant supply lines in fluid communication with the lubricant tank and the gearbox assembly, one or more secondary gearbox lubricant supply lines in fluid communication with the lubricant tank and the gearbox assembly, and a lubricant pump for supplying the lubricant to the gearbox assembly from the lubricant tank through the one or more primary gearbox lubricant supply lines and the one or more secondary gearbox lubricant supply lines, the lubrication system modulating a mass flow rate of the lubricant to the gearbox assembly through at least one of the one or more primary gearbox lubricant supply lines or the one or more secondary gearbox lubricant supply lines.

The turbine engine of the preceding clause, further comprising an electric machine drivingly coupled to the input shaft, the lubrication system further comprising one or more primary electric machine lubricant supply lines in fluid communication with the lubricant tank and the electric machine, and one or more secondary electric machine lubricant supply lines in fluid communication with the lubricant tank and the electric machine, the lubricant pump supplying the lubricant to the electric machine from the lubricant tank through the one or more primary electric machine lubricant supply lines and the one or more secondary electric machine lubricant supply lines, the lubrication system modulating a mass flow rate of the lubricant to the electric machine through at least one of the one or more primary electric machine lubricant supply lines or the one or more secondary electric machine lubricant supply lines.

The turbine engine of any preceding clause, further comprising one or more shaft bearings that support rotation of the input shaft, the lubrication system further comprising one or more primary turbine engine lubricant supply lines in fluid communication with the lubricant tank and the one or more shaft bearings, and one or more secondary turbine engine lubricant supply lines in fluid communication with the lubricant tank and the one or more shaft bearings, the lubricant pump supplying the lubricant to the one or more shaft bearings from the lubricant tank through the one or more primary turbine engine lubricant supply lines and the one or more secondary turbine engine lubricant supply lines, the lubrication system modulating a mass flow rate of the lubricant to the turbine engine through at least one of the one or more primary turbine engine lubricant supply lines or the one or more secondary turbine engine lubricant supply lines.

The turbine engine of any preceding clause, the plurality of gears meshing with each other at a mesh, the one or more primary gearbox lubricant supply lines and the one or more secondary gearbox lubricant supply lines directing the lubricant to the mesh.

The turbine engine of any preceding clause, the one or more primary gearbox lubricant supply lines including a first primary gearbox lubricant supply line in fluid communication with the mesh.

The turbine engine of any preceding clause, the one or more secondary gearbox lubricant supply lines including a first secondary gearbox lubricant supply line in fluid communication with the mesh.

The turbine engine of any preceding clause, the gear assembly including one or more bearings, the one or more primary gearbox lubricant supply lines and the one or more secondary gearbox lubricant supply lines directing the lubricant to the one or more bearings.

The turbine engine of any preceding clause, the one or more primary gearbox lubricant supply lines including a second primary gearbox lubricant supply line in fluid communication with the one or more bearings.

The turbine engine of any preceding clause, the one or more secondary gearbox lubricant supply lines including a second secondary gearbox lubricant supply line in fluid communication with the one or more bearings.

The turbine engine of any preceding clause, the lubrication system further comprising one or more valves disposed in at least one of the one or more primary gearbox lubricant supply lines or the one or more primary gearbox lubricant supply lines for modulating the mass flow rate of the lubricant to the gearbox assembly.

The turbine engine of any preceding clause, the one or more valves including a primary valve disposed in the one or more primary gearbox lubricant supply lines for modulating the mass flow rate of the lubricant to the gearbox assembly through the one or more primary gearbox lubricant supply lines.

The turbine engine of any preceding clause, the primary valve being a proportional modulating valve that includes a primary valve member that moves between a fully opened position and a fully closed position to modulate the mass flow rate of the lubricant through the one or more primary gearbox lubricant supply lines.

The turbine engine of any preceding clause, the one or more valves including a secondary valve disposed in the one or more secondary gearbox lubricant supply lines for modulating the mass flow rate of the lubricant to the gearbox assembly through the one or more secondary gearbox lubricant supply lines.

The turbine engine of any preceding clause, the secondary valve being a shut-off valve that includes a secondary valve member that moves between an opened position and a closed position to turn on or to turn off the lubricant through the one or more secondary gearbox lubricant supply lines.

A turbine engine comprises a turbo-engine including a compressor section, a combustor, and a turbine section, the turbo-engine having an input shaft that couples the compressor section to the turbine section, a gearbox assembly including a gear assembly having a plurality of gears that mesh with each other at a mesh, a propulsor having an output shaft drivingly coupled to the input shaft through the gear assembly, and a lubrication system comprising a lubricant tank that stores lubricant therein, one or more primary gearbox lubricant supply lines in fluid communication with the lubricant tank and the gearbox assembly, the one or more primary gearbox lubricant supply lines directing the lubricant to the mesh, one or more secondary gearbox lubricant supply lines in fluid communication with the lubricant tank and the gearbox assembly, the one or more secondary gearbox lubricant supply lines directing the lubricant to the mesh, one or more valves disposed in at least one of the one or more primary gearbox lubricant supply lines or the one or more primary gearbox lubricant supply lines, and a lubricant pump for supplying the lubricant to the mesh from the lubricant tank through the one or more primary gearbox lubricant supply lines and the one or more secondary gearbox lubricant supply lines, the lubrication system controlling the one or more valves to modulate a mass flow rate of the lubricant to the mesh through the at least one of the one or more primary gearbox lubricant supply lines or the one or more secondary gearbox lubricant supply lines.

The turbine engine of any preceding clause, further comprising an electric machine drivingly coupled to the input shaft, the lubrication system further comprising one or more primary electric machine lubricant supply lines in fluid communication with the lubricant tank and the electric machine, and one or more secondary electric machine lubricant supply lines in fluid communication with the lubricant tank and the electric machine, the lubricant pump supplying the lubricant to the electric machine from the lubricant tank through the one or more primary electric machine lubricant supply lines and the one or more secondary electric machine lubricant supply lines, the lubrication system modulating a mass flow rate of the lubricant to the electric machine through at least one of the one or more primary electric machine lubricant supply lines or the one or more secondary electric machine lubricant supply lines.

The turbine engine of any preceding clause, further comprising one or more shaft bearings that support rotation of the input shaft, the lubrication system further comprising one or more primary turbine engine lubricant supply lines in fluid communication with the lubricant tank and the one or more shaft bearings, and one or more secondary turbine engine lubricant supply lines in fluid communication with the lubricant tank and the one or more shaft bearings, the lubricant pump supplying the lubricant to the one or more shaft bearings from the lubricant tank through the one or more primary turbine engine lubricant supply lines and the one or more secondary turbine engine lubricant supply lines, the lubrication system modulating a mass flow rate of the lubricant to the turbine engine through at least one of the one or more primary turbine engine lubricant supply lines or the one or more secondary turbine engine lubricant supply lines.

The turbine engine of any preceding clause, the gear assembly including one or more bearings, the one or more primary gearbox lubricant supply lines and the one or more secondary gearbox lubricant supply lines directing the lubricant to the one or more bearings.

The turbine engine of any preceding clause, the one or more valves including a primary valve disposed in the one or more primary gearbox lubricant supply lines for modulating the mass flow rate of the lubricant to the mesh through the one or more primary gearbox lubricant supply lines.

The turbine engine of any preceding clause, the one or more valves including a secondary valve disposed in the one or more secondary gearbox lubricant supply lines for modulating the mass flow rate of the lubricant to the mesh through the one or more secondary gearbox lubricant supply lines.

A method of operating the turbine engine of any preceding clause, the method comprising supplying the lubricant to the gearbox assembly from the lubricant tank through the one or more primary gearbox lubricant supply lines and the one or more secondary gearbox lubricant supply lines, and modulating a mass flow rate of the lubricant to the gearbox assembly through at least one of the one or more primary gearbox lubricant supply lines or the one or more secondary gearbox lubricant supply lines.

The method of the preceding clause, further comprising supplying the lubricant to an electric machine from the lubricant tank through one or more primary electric machine lubricant supply lines and one or more secondary electric machine lubricant supply lines, and modulating a mass flow rate of the lubricant to the electric machine through at least one of the one or more primary electric machine lubricant supply lines or the one or more secondary electric machine lubricant supply lines.

The method of any preceding clause, further comprising supplying the lubricant to one or more shaft bearings of the turbine engine from the lubricant tank through one or more primary turbine engine lubricant supply lines and one or more secondary turbine engine lubricant supply lines, and modulating a mass flow rate of the lubricant to the turbine engine through at least one of the one or more primary turbine engine lubricant supply lines or the one or more secondary turbine engine lubricant supply lines.

The method of any preceding clause, further comprising directing the lubricant to a mesh of the plurality of gears through the one or more primary gearbox lubricant supply lines and the one or more secondary gearbox lubricant supply lines.

The method of any preceding clause, further comprising directing the lubricant to the mesh through a first primary gearbox lubricant supply line of the one or more primary gearbox lubricant supply lines.

The method of any preceding clause, further comprising directing the lubricant to the mesh through a first secondary gearbox lubricant supply line of the one or more secondary gearbox lubricant supply lines.

The method of any preceding clause, further comprising directing the lubricant to one or more bearings of the gearbox assembly through the one or more primary gearbox lubricant supply lines and the one or more secondary gearbox lubricant supply lines.

The method of any preceding clause, further comprising directing the lubricant to the one or more bearings through a second primary gearbox lubricant supply line of the one or more primary gearbox lubricant supply lines.

The method of any preceding clause, further comprising directing the lubricant to the one or more bearings through a second secondary gearbox lubricant supply line of the one or more secondary gearbox lubricant supply lines.

The method of any preceding clause, further comprising modulating the mass flow rate of the lubricant to the gearbox assembly with one or more valves disposed in at least one of one or more primary gearbox lubricant supply lines or the one or more primary gearbox lubricant supply lines.

The method of any preceding clause, further comprising modulating the mass flow rate of the lubricant to the gearbox assembly with a primary valve of the one or more valves in the one or more primary gearbox lubricant supply lines.

The method of any preceding clause, the primary valve being a proportional modulating valve that includes a primary valve member, and the method further comprising moving the primary valve member between a fully opened position and a fully closed position to modulate the mass flow rate of the lubricant through the one or more primary gearbox lubricant supply lines.

The method of any preceding clause, further comprising modulating the mass flow rate of the lubricant to the gearbox assembly with a secondary valve of the one or more valves in the one or more secondary gearbox lubricant supply lines.

The method of any preceding clause, the secondary valve being a shut-off valve that includes a secondary valve member, and the method further comprising moving the secondary valve member between an opened position and a closed position to turn on or to turn off the lubricant through the one or more secondary gearbox lubricant supply lines.

A turbine engine including a turbo-engine including a compressor section, a combustor, and a turbine section, the turbo-engine having an input shaft that couples the compressor section to the turbine section, a propulsor having an output shaft drivingly coupled to the input shaft, an electric machine drivingly coupled to the input shaft, and a lubrication system including a lubricant tank that stores lubricant therein, one or more primary electric machine lubricant supply lines in fluid communication with the lubricant tank and the electric machine, one or more secondary electric machine lubricant supply lines in fluid communication with the lubricant tank and the electric machine, and a lubricant pump for supplying the lubricant to the electric machine from the lubricant tank through the one or more primary electric machine lubricant supply lines and the one or more secondary electric machine lubricant supply lines, the lubrication system modulating a mass flow rate of the lubricant to the electric machine through at least one of the one or more primary electric machine lubricant supply lines or the one or more secondary electric machine lubricant supply lines.

The turbine engine of any preceding clause, the lubrication system further comprising one or more valves disposed in at least one of the one or more primary electric machine lubricant supply lines or the one or more primary electric machine lubricant supply lines for modulating the mass flow rate of the lubricant to the electric machine.

The turbine engine of any preceding clause, the one or more valves including a primary valve disposed in the one or more primary electric machine supply lines for modulating the mass flow rate of the lubricant to the electric machine through the one or more primary electric machine lubricant supply lines.

The turbine engine of any preceding clause, the primary valve being a proportional modulating valve that includes a primary valve member that moves between a fully opened position and a fully closed position to modulate the mass flow rate of the lubricant through the one or more primary electric machine lubricant supply lines.

The turbine engine of any preceding clause, the one or more valves including a secondary valve disposed in the one or more secondary electric machine lubricant supply lines for modulating the mass flow rate of the lubricant to the electric machine assembly through the one or more secondary electric machine lubricant supply lines.

The turbine engine of any preceding clause, the secondary valve being a shut-off valve that includes a secondary valve member that moves between an opened position and a closed position to turn on or to turn off the lubricant through the one or more secondary electric machine lubricant supply lines.

A method of operating the turbine engine of any preceding clause, the method comprising supplying the lubricant to the electric machine from the lubricant tank through the one or more primary electric machine lubricant supply lines and the one or more secondary electric machine lubricant supply lines, and modulating a mass flow rate of the lubricant to the electric machine through at least one of the one or more primary electric machine lubricant supply lines or the one or more secondary electric machine lubricant supply lines.

The method of any preceding clause, further comprising modulating the mass flow rate of the lubricant to the electric machine with one or more valves disposed in at least one of one or more primary electric machine lubricant supply lines or the one or more primary electric machine lubricant supply lines.

The method of any preceding clause, further comprising modulating the mass flow rate of the lubricant to the electric machine with a primary valve of the one or more valves in the one or more primary electric machine lubricant supply lines.

The method of any preceding clause, the primary valve being a proportional modulating valve that includes a primary valve member, and the method further comprising moving the primary valve member between a fully opened position and a fully closed position to modulate the mass flow rate of the lubricant through the one or more primary electric machine lubricant supply lines.

The method of any preceding clause, further comprising modulating the mass flow rate of the lubricant to the electric machine with a secondary valve of the one or more valves in the one or more secondary electric machine lubricant supply lines.

The method of any preceding clause, the secondary valve being a shut-off valve that includes a secondary valve member, and the method further comprising moving the secondary valve member between an opened position and a closed position to turn on or to turn off the lubricant through the one or more secondary electric machine lubricant supply lines.

A turbine engine including a turbo-engine including a compressor section, a combustor, and a turbine section, the turbo-engine having an input shaft that couples the compressor section to the turbine section, a propulsor having an output shaft drivingly coupled to the input shaft, one or more shaft bearings for support rotation of the input shaft, and a lubrication system including a lubricant tank that stores lubricant therein, one or more primary turbine engine lubricant supply lines in fluid communication with the lubricant tank and the one or more shaft bearings, one or more secondary turbine engine lubricant supply lines in fluid communication with the lubricant tank and the one or more shaft bearings, and a lubricant pump for supplying the lubricant to the one or more shaft bearings from the lubricant tank through the one or more primary turbine engine lubricant supply lines and the one or more secondary turbine engine lubricant supply lines, the lubrication system modulating a mass flow rate of the lubricant to the one or more shaft bearings through at least one of the one or more primary turbine engine lubricant supply lines or the one or more secondary turbine engine lubricant supply lines.

The turbine engine of the preceding clause, wherein the compressor section includes a low-pressure compressor and the turbine section includes a low-pressure turbine, and the turbine engine further comprises a low-pressure shaft that couples the low-pressure compressor to the low-pressure turbine.

The turbine engine of any preceding clause, wherein the compressor section includes a high-pressure compressor and the turbine section includes a high-pressure turbine, and the turbine engine further comprises a high-pressure shaft that couples the high-pressure compressor to the high-pressure turbine.

The turbine engine of any preceding clause, wherein the input shaft is one of the low-pressure shaft or the high-pressure shaft.

The turbine engine of any preceding clause, wherein the one or more shaft bearings include one or more low-pressure shaft bearings that support rotation of the low-pressure shaft, the one or more primary turbine engine lubricant supply lines and the one or more secondary turbine engine lubricant supply lines directing the lubricant to the one or more low-pressure shaft bearings.

The turbine engine of any preceding clause, wherein the one or more shaft bearings include one or more high-pressure shaft bearings that support rotation of the high-pressure shaft, the one or more primary turbine engine lubricant supply lines and the one or more secondary turbine engine lubricant supply lines directing the lubricant to the one or more high-pressure shaft bearings.

The turbine engine of any preceding clause, the one or more primary turbine engine lubricant supply lines including a first primary turbine engine lubricant supply line in fluid communication with the low-pressure shaft bearings.

The turbine engine of any preceding clause, the one or more secondary turbine engine lubricant supply lines including a first secondary turbine engine lubricant supply line in fluid communication with the low-pressure shaft bearings.

The turbine engine of any preceding clause, the one or more primary turbine engine lubricant supply lines including a second primary turbine engine lubricant supply line in fluid communication with the high-pressure shaft bearings.

The turbine engine of any preceding clause, the one or more secondary turbine engine lubricant supply lines including a second secondary turbine engine lubricant supply line in fluid communication with the one or more high-pressure shaft bearings.

The turbine engine of any preceding clause, the lubrication system further comprising one or more valves disposed in at least one of the one or more primary turbine engine lubricant supply lines or the one or more primary turbine engine lubricant supply lines for modulating the mass flow rate of the lubricant to the one or more shaft bearings.

The turbine engine of any preceding clause, the one or more valves including a primary valve disposed in the one or more primary turbine engine lubricant supply lines for modulating the mass flow rate of the lubricant to the one or more shaft bearings through the one or more primary turbine engine lubricant supply lines.

The turbine engine of any preceding clause, the primary valve being a proportional modulating valve that includes a primary valve member that moves between a fully opened position and a fully closed position to modulate the mass flow rate of the lubricant through the one or more primary turbine engine lubricant supply lines.

The turbine engine of any preceding clause, the one or more valves including a secondary valve disposed in the one or more secondary turbine engine lubricant supply lines for modulating the mass flow rate of the lubricant to the one or more shaft bearings through the one or more secondary turbine engine lubricant supply lines.

The turbine engine of any preceding clause, the secondary valve being a shut-off valve that includes a secondary valve member that moves between an opened position and a closed position to turn on or to turn off the lubricant through the one or more secondary turbine engine lubricant supply lines.

A method of operating the turbine engine of any preceding clause, the method comprising supplying the lubricant to the one or more shaft bearings from the lubricant tank through the one or more primary turbine engine lubricant supply lines and the one or more secondary turbine engine lubricant supply lines, and modulating a mass flow rate of the lubricant to the one or more shaft bearings through at least one of the one or more primary turbine engine lubricant supply lines or the one or more secondary turbine engine lubricant supply lines.

The method of any preceding clause, further comprising directing the lubricant to one or more low-pressure shaft bearings of the one or more shaft bearings through the one or more primary turbine engine lubricant supply lines and the one or more secondary turbine engine lubricant supply lines.

The method of any preceding clause, further comprising directing the lubricant to one or more high-pressure shaft bearings of the one or more shaft bearings through the one or more primary turbine engine lubricant supply lines and the one or more secondary turbine engine lubricant supply lines.

The method of any preceding clause, further comprising directing the lubricant to the one or more low-pressure shaft bearings through a first primary turbine engine lubricant supply line of the one or more primary turbine engine lubricant supply lines.

The method of any preceding clause, further comprising directing the lubricant to the one or more low-pressure shaft bearings through a first secondary turbine engine lubricant supply line of the one or more secondary turbine engine lubricant supply lines.

The method of any preceding clause, further comprising directing the lubricant to the one or more high-pressure shaft bearings through one or more second primary turbine engine lubricant supply lines of the one or more primary turbine engine lubricant supply lines.

The method of any preceding clause, further comprising directing the lubricant to the one or more high-pressure shaft bearings through one or more second secondary turbine engine lubricant supply lines of the one or more secondary turbine engine lubricant supply lines.

The method of any preceding clause, further comprising modulating the mass flow rate of the lubricant to the one or more shaft bearings with one or more valves disposed in at least one of one or more primary turbine engine lubricant supply lines or the one or more primary turbine engine lubricant supply lines.

The method of any preceding clause, further comprising modulating the mass flow rate of the lubricant to the one or more shaft bearings with a primary valve of the one or more valves in the one or more primary turbine engine lubricant supply lines.

The method of any preceding clause, the primary valve being a proportional modulating valve that includes a primary valve member, and the method further comprising moving the primary valve member between a fully opened position and a fully closed position to modulate the mass flow rate of the lubricant through the one or more primary turbine engine lubricant supply lines.

The method of any preceding clause, further comprising modulating the mass flow rate of the lubricant to the one or more shaft bearings with a secondary valve of the one or more valves in the one or more secondary turbine engine lubricant supply lines.

The method of any preceding clause, the secondary valve being a shut-off valve that includes a secondary valve member, and the method further comprising moving the secondary valve member between an opened position and a closed position to turn on or to turn off the lubricant through the one or more secondary turbine engine lubricant supply lines.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A turbine engine comprising:
   a turbo-engine including a compressor section, a combustor, and a turbine section, the turbo-engine having an input shaft that couples the compressor section to the turbine section;

a gearbox assembly including a gear assembly having a plurality of gears;

a propulsor having an output shaft drivingly coupled to the input shaft through the gear assembly; and a lubrication system comprising:

a lubricant tank that stores lubricant therein;

a primary gearbox lubricant supply line in fluid communication with the lubricant tank and a component of the gearbox assembly;

a secondary gearbox lubricant supply line in fluid communication with the lubricant tank and the component of the gearbox assembly in parallel with the primary gearbox lubricant supply line;

a primary valve disposed in the primary gearbox lubricant supply line, wherein the primary valve is a proportional modulating valve that includes a primary valve member that moves between a fully opened position and a fully closed position;

a lubricant pump for supplying the lubricant to the component of the gearbox assembly from the lubricant tank through the primary gearbox lubricant supply line and the secondary gearbox lubricant supply line in parallel; and a controller having one or more processors and a memory, and the controller configured to control the primary valve member between the fully opened position and the fully closed position to modulate a mass flow rate of the lubricant to the component of the gearbox assembly through the primary gearbox lubricant supply line.

2. The turbine engine of claim 1, further comprising an electric machine drivingly coupled to the input shaft, wherein the lubrication system further comprises:

a primary electric machine lubricant supply line in fluid communication with the lubricant tank and the electric machine; and a secondary electric machine lubricant supply line in fluid communication with the lubricant tank and the electric machine, wherein the lubricant pump supplies the lubricant to the electric machine from the lubricant tank through the primary electric machine lubricant supply line and the secondary electric machine lubricant supply line, the lubrication system modulating a mass flow rate of the lubricant to the electric machine through at least one of the primary electric machine lubricant supply line or the secondary electric machine lubricant supply line.

3. The turbine engine of claim 1, further comprising one or more shaft bearings that support rotation of the input shaft, wherein the lubrication system further comprises:

a primary turbine engine lubricant supply line in fluid communication with the lubricant tank and the one or more shaft bearings; and a secondary turbine engine lubricant supply line in fluid communication with the lubricant tank and the one or more shaft bearings, wherein the lubricant pump supplies the lubricant to the one or more shaft bearings from the lubricant tank through the primary turbine engine lubricant supply line and the secondary turbine engine lubricant supply line in parallel, the lubrication system modulating a mass flow rate of the lubricant to the turbine engine through at least one of the primary turbine engine lubricant supply line or the secondary turbine engine lubricant supply line.

4. The turbine engine of claim 1, wherein the plurality of gears meshes with each other at a mesh, the component of the gearbox assembly being the mesh such that the primary gearbox lubricant supply line and the one or more secondary gearbox lubricant supply line direct the lubricant to the mesh in parallel.

5. The turbine engine of claim 4, wherein the primary gearbox lubricant supply line is a first primary gearbox lubricant supply line and the lubrication system further comprises a second primary gearbox lubricant supply line in fluid communication with one or more bearings of the plurality of gears.

6. The turbine engine of claim 5, wherein the secondary gearbox lubricant supply line is a first secondary gearbox lubricant supply line and the lubrication system further comprises a second secondary gearbox lubricant supply line in fluid communication with the one or more bearings.

7. The turbine engine of claim 1, wherein the gear assembly includes one or more bearings, the component of the gearbox assembly being the one or more bearings such that the primary gearbox lubricant supply line and the secondary gearbox lubricant supply line direct the lubricant to the one or more bearings in parallel.

8. The turbine engine of claim 1, further comprising a secondary valve disposed in the secondary gearbox lubricant supply line for modulating the mass flow rate of the lubricant to the component of the gearbox assembly through the secondary gearbox lubricant supply line.

9. The turbine engine of claim 8, wherein the secondary valve is a shut-off valve that includes a valve member that moves between an opened position and a closed position to turn on or to turn off the lubricant through the secondary gearbox lubricant supply line.

10. The turbine engine of claim 8, further comprising a return line in fluid communication with the secondary valve and the lubricant tank, the return line directing the lubricant to the lubricant tank from the secondary valve when the secondary valve is in a closed position.

11. The turbine engine of claim 1, wherein the lubrication system includes one or more lubricant supply lines in fluid communication with the lubricant pump, wherein the primary gearbox lubricant supply line and the secondary gearbox lubricant supply line branch from the one or more lubricant supply lines to the component of the gearbox assembly in parallel.

12. The turbine engine of claim 1, further comprising a return line in fluid communication with the primary valve and the lubricant tank, the return line directing a portion of the lubricant to the lubricant tank from the primary valve when the primary valve is in the fully closed position or in a partially opened position.

13. A turbine engine comprising:

a turbo-engine including a compressor section, a combustor, and a turbine section, the turbo-engine having an input shaft that couples the compressor section to the turbine section;

a gearbox assembly including a gear assembly having a plurality of gears that mesh with each other at a mesh;

a propulsor having an output shaft drivingly coupled to the input shaft through the gear assembly; and a lubrication system comprising:

a lubricant tank that stores lubricant therein;

a primary gearbox lubricant supply line in fluid communication with the lubricant tank and the gearbox assembly, wherein the primary gearbox lubricant supply line directs the lubricant to the mesh;

a secondary gearbox lubricant supply line in fluid communication with the lubricant tank and the gearbox assembly, wherein the secondary gearbox lubricant supply line directs the lubricant to the mesh in parallel with the primary gearbox lubricant supply line;

one or more valves disposed in at least one of the primary gearbox lubricant supply line or the secondary gearbox lubricant supply line; and a lubricant pump for supplying the lubricant to the mesh from the lubricant tank through the primary gearbox lubricant supply line and the secondary gearbox lubricant supply line in parallel, the lubrication system controlling the one or more valves to modulate a mass flow rate of the lubricant to the mesh through the at least one of the primary gearbox lubricant supply line or the secondary gearbox lubricant supply line.

14. The turbine engine of claim 13, further comprising an electric machine drivingly coupled to the input shaft, wherein the lubrication system further comprises:

a primary electric machine lubricant supply line in fluid communication with the lubricant tank and the electric machine; and a secondary electric machine lubricant supply line in fluid communication with the lubricant tank and the electric machine, wherein the lubricant pump supplies the lubricant to the electric machine from the lubricant tank through the primary electric machine lubricant supply line and the secondary electric machine lubricant supply line, the lubrication system modulating a mass flow rate of the lubricant to the electric machine through at least one of the primary electric machine lubricant supply line or the secondary electric machine lubricant supply line.

15. The turbine engine of claim 13, further comprising one or more shaft bearings that support rotation of the input shaft, wherein the lubrication system further comprises:

a primary turbine engine lubricant supply line in fluid communication with the lubricant tank and the one or more shaft bearings; and a secondary turbine engine lubricant supply line in fluid communication with the lubricant tank and the one or more shaft bearings, wherein the lubricant pump supplies the lubricant to the one or more shaft bearings from the lubricant tank through the primary turbine engine lubricant supply line and the secondary turbine engine lubricant supply line in parallel, the lubrication system modulating a mass flow rate of the lubricant to the turbine engine through at least one of the primary turbine engine lubricant supply line or the secondary turbine engine lubricant supply line.

16. The turbine engine of claim 13, wherein the gear assembly includes one or more bearings, the primary gearbox lubricant supply line being a first primary gearbox lubricant supply line and the lubrication system further comprising a second primary gearbox lubricant supply line in fluid communication with the one or more bearings for directing the lubricant to the one or more bearings.

17. The turbine engine of claim 16, wherein the secondary gearbox lubricant supply line is a first secondary gearbox lubricant supply line and the lubrication system further comprises a second secondary gearbox lubricant supply line in fluid communication with the one or more bearings for directing the lubricant to the one or more bearings.

18. The turbine engine of claim 13, wherein the one or more valves include a primary valve disposed in the primary gearbox lubricant supply line for modulating the mass flow rate of the lubricant to the mesh through the primary gearbox lubricant supply line.

19. The turbine engine of claim 13, wherein the one or more valves include a valve disposed in the secondary gearbox lubricant supply line for modulating the mass flow rate of the lubricant to the mesh through the secondary gearbox lubricant supply line.

20. The turbine engine of claim 13, further comprising a return line in fluid communication with the one or more valves and the lubricant tank, the return line directing a portion of the lubricant to the lubricant tank from the one or more valves when the one or more valves are in a fully closed position or in a partially opened position.

* * * * *